US012808766B2

(12) United States Patent
Potasek et al.

(10) Patent No.: US 12,808,766 B2
(45) Date of Patent: Nov. 24, 2026

(54) MEMS DENSIMETER

(71) Applicant: Rosemount Aerospace Inc., Burnsville, MN (US)

(72) Inventors: David Potasek, Lakeville, MN (US); Dosi Dosev, Chanhassen, MN (US)

(73) Assignee: Rosemount Aerospace Inc., Burnsville, MN (US)

(*) Notice: Subject to any disclaimer, the term of this patent is extended or adjusted under 35 U.S.C. 154(b) by 286 days.

(21) Appl. No.: 18/632,821

(22) Filed: Apr. 11, 2024

(65) Prior Publication Data

US 2025/0321174 A1 Oct. 16, 2025

(51) Int. Cl.
*G01N 9/34* (2006.01)
*G01N 9/00* (2006.01)
*G01N 11/16* (2006.01)

(52) U.S. Cl.
CPC .................................... *G01N 9/34* (2013.01)

(58) Field of Classification Search
CPC .......... G01N 9/34; G01N 11/16; G01N 9/002; G01N 2009/006
See application file for complete search history.

(56) References Cited

U.S. PATENT DOCUMENTS 6,575,020 B1 * 6/2003 de Charmoy Grey .................... G01N 9/002 73/54.23
7,434,457 B2 10/2008 Goodwin et al.
7,458,265 B2 12/2008 Shih et al.
7,562,557 B2 7/2009 Bennett et al.
7,574,898 B2 8/2009 Harrison et al.
7,952,154 B2 5/2011 Guo et al.
8,141,427 B2 3/2012 Wang et al.
8,438,919 B2 5/2013 Phillips et al.
9,010,190 B2 4/2015 Potasek et al.
9,034,264 B2 5/2015 Day
9,038,443 B1 5/2015 Pace et al.
9,783,411 B1 10/2017 Potasek et al.
(Continued)

FOREIGN PATENT DOCUMENTS

CN 111537396 A 8/2020

OTHER PUBLICATIONS

Anthony R.H. Goodwin et al. "A Vibrating Edge Supported Plate, Fabricated by the Methods of Micro Electro Mechanical System for the Simultaneous Measurement of Density and Viscosity: Results for Methylbenzene and Octane at Temperatures between (323 and 423) K and Pressures in the Range (0.1 to 68) MPa"; J. Chem. Eng. Data 2006, 51, 190-208; Published Dec. 10, 2005; https://pubs.acs.org/doi/full/10.1021/je0503296.
(Continued)

*Primary Examiner* — Daniel S Larkin
*Assistant Examiner* — Anthony W Megna Fuentes
(74) *Attorney, Agent, or Firm* — Suiter Swantz IP

(57) ABSTRACT

A MEMS densimeter may include a cantilever portion defining one or more microcapillaries. The microcapillaries may provide an enhanced response to the fluid density. The microcapillaries may include microcapillaries which are aligned with flexure of the cantilever portion, such as through-hole microcapillaries, blind-hole microcapillaries, and grid microcapillaries. The microcapillaries may also include a plate microcapillary aligned normal to the flexure of the cantilever portion.

20 Claims, 17 Drawing Sheets

(56) References Cited

U.S. PATENT DOCUMENTS

| | | | | |
|---|---|---|---|---|
| 9,970,853 | B2 | 5/2018 | Lal et al. | |
| 10,177,733 | B2 | 1/2019 | Yoo | |
| 10,656,035 | B2 | 5/2020 | Golly et al. | |
| 10,830,681 | B2 | 11/2020 | Huber et al. | |
| 10,861,665 | B1 | 12/2020 | Backman et al. | |
| 10,896,885 | B2 | 1/2021 | West et al. | |
| 10,935,404 | B2 | 3/2021 | Reith et al. | |
| 11,099,093 | B2 | 8/2021 | Potasek et al. | |
| 11,474,092 | B2 | 10/2022 | Huber et al. | |
| 11,649,158 | B2 | 5/2023 | Dosev et al. | |
| 11,662,263 | B2 | 5/2023 | Potasek et al. | |
| 11,692,895 | B2 | 7/2023 | Potasek et al. | |
| 11,768,094 | B2 | 9/2023 | Reith et al. | |
| 11,768,121 | B2 | 9/2023 | Potasek et al. | |
| 11,855,604 | B2 | 12/2023 | Vercesi et al. | |
| 11,881,838 | B2 | 1/2024 | Dehara et al. | |
| 2008/0011058 | A1 | 1/2008 | Lal et al. | |
| 2009/0120168 | A1 | 5/2009 | Harrison et al. | |
| 2012/0304758 | A1* | 12/2012 | Kumar | E21B 47/00<br>73/152.55 |
| 2019/0317037 | A1* | 10/2019 | Huber | G01N 29/222 |
| 2021/0255131 | A1 | 8/2021 | Evju et al. | |
| 2023/0193831 | A1 | 6/2023 | Swann et al. | |
| 2024/0009668 | A1 | 1/2024 | Hazbun et al. | |

OTHER PUBLICATIONS

Christof Huber, "MEMS-based Micro-Coriolis Density and Flow Measurement Technology", Conference Paper—May 2015, Published May 1, 2015; https://www.researchgate.net/publication/310192990_MEMS-based_Micro-Coriolis_Density_and_Flow_Measurement_Technology; DOI: 10.5162/sensor2015/B6.1.

Libo Zhao et al, "A MEMS Resonant Sensor to Measure Fluid Density and Viscosity under Flexural and Torsional Vibrating Modes"; Sensors 2016, 16, 830; doi: 10.3390/s16060830; Published Jun. 6, 2016; https://www.mdpi.com/1424-8220/16/6/830.

Mohd. Zahid Ansari, et al "Comparison between Deflection and Vibration Characteristics of Rectangular and Trapezoidal profile Microcantilevers"; Sensors 2009, 9, 2706-2718; doi: 10.3390/s90402706; Published Apr. 16, 2009; https://www.ncbi.nlm.nih.gov/pmc/articles/PMC3348801/.

* cited by examiner

100

700

MEMS DENSIMETER

TECHNICAL FIELD

The present disclosure generally relates to micromechanical structures, and more specifically to a cantilever structures.

BACKGROUND

Introduction of new fuel mixes, such as Sustainable aviation fuel (SAF), in the aviation industry requires precise monitoring of the fuel properties. One fuel property to be measured includes density. Fuel density sensors are bulky and expensive. Micro-Electro-Mechanical systems (MEMS) based fuel density sensors may provide a miniaturized solution for fuel density measurement.

One approach to MEMS densimeters is a microfluidic channel approach. The microfluidic channel approach uses a vibrating structure with a microfluidic channel. As the density of the fluid in the microfluidic channel changes, the mass of the structure changes and thus the resonant frequency changes. The resonator can operate in air or vacuum and thus can achieve a high Q factor. The disadvantage of the microfluidic approach is the possible clogging in real world environments and the need for a pump to continuously push fluid through the microfluidic channel to ensure real time sampling of the whole tank.

Another approach to MEMS densimeters is a cantilever approach. The cantilever-based approach uses a cantilever submerged in the fluid of interest. The cantilever resonance is somewhat a function of the density of the fluid, and the Q factor is a function of the viscosity of the fluid. The cantilever approach does not use a pump to sample a large container and is robust to particulates, unlike the microfluidic approach. However, the lower Q factors and a less direct resonance relationship to density leads to inferior performance compared to the microfluidic approach. Therefore, it would be advantageous to provide a device, system, and method that cures the shortcomings described above.

SUMMARY

In some aspects, the techniques described herein relate to a MEMS densimeter including: a substrate including a fixed portion and a cantilever portion, wherein the cantilever portion extends from the fixed portion, wherein the cantilever portion is unsupported at a free end opposite to the fixed portion; an inductor disposed on the cantilever portion, wherein the inductor is configured to cause the cantilever portion to flexure relative to the fixed portion; a strain gauge disposed at an interface between the fixed portion and the cantilever portion; and a plurality of bond pads disposed on the fixed portion, wherein the plurality of bond pads are configured to input an alternating current to the inductor, wherein the plurality of bond pads are configured to receive a strain measurement from the strain gauge; wherein the cantilever portion defines a plurality of microcapillaries through at least a portion of a thickness of the cantilever portion, wherein the plurality of microcapillaries are aligned with the flexure.

In some aspects, the techniques described herein relate to a MEMS densimeter, wherein the cantilever portion includes a rectangular shape.

In some aspects, the techniques described herein relate to a MEMS densimeter, including at least one of: a pair of inductors, wherein the inductor is one of the pair of inductors, wherein a top inductor of the pair of inductors is disposed on a top surface of the cantilever portion and a bottom inductor of the pair of inductors is disposed on a bottom surface of the cantilever portion; or a pair of strain gauges, wherein the strain gauge is one of the pair of strain gauges, wherein a top strain gauge of the pair of strain gauges is disposed on a top surface of the substrate at the interface and a bottom strain gauge of the pair of strain gauges is disposed on a bottom surface of the substrate at the interface.

In some aspects, the techniques described herein relate to a MEMS densimeter, wherein the cantilever portion defines the plurality of microcapillaries at the free end.

In some aspects, the techniques described herein relate to a MEMS densimeter, wherein the cantilever portion defines the plurality of microcapillaries between the free end and the fixed portion.

In some aspects, the techniques described herein relate to a MEMS densimeter, wherein the cantilever portion defines the plurality of microcapillaries along one or more edges of the cantilever portion.

In some aspects, the techniques described herein relate to a MEMS densimeter, wherein the plurality of microcapillaries are arranged in a lattice.

In some aspects, the techniques described herein relate to a MEMS densimeter, wherein the lattice includes one of a rectangular lattice or a square lattice.

In some aspects, the techniques described herein relate to a MEMS densimeter, wherein the plurality of microcapillaries include a plurality of through-hole microcapillaries, wherein the plurality of through-hole microcapillaries are defined through the thickness of the cantilever portion.

In some aspects, the techniques described herein relate to a MEMS densimeter, wherein the plurality of microcapillaries include a plurality of blind-hole microcapillaries, wherein the plurality of blind-hole microcapillaries are defined through the portion of the thickness of the cantilever portion.

In some aspects, the techniques described herein relate to a MEMS densimeter, wherein the plurality of microcapillaries include a plurality of grid microcapillaries, wherein the plurality of grid microcapillaries are defined through the portion of the thickness of the cantilever portion.

In some aspects, the techniques described herein relate to a MEMS densimeter, wherein the cantilever portion includes a plurality of pillars and a base, wherein the base extends from the fixed portion, wherein the plurality of pillars extend from the base, wherein the plurality of pillars define the plurality of grid microcapillaries.

In some aspects, the techniques described herein relate to a MEMS densimeter, including an array of cantilever portions, an array of inductors, and an array of strain gauges, wherein the cantilever portion is one of the array of cantilever portions, wherein the inductor is one of the array of inductors, wherein the strain gauge is one of the array of strain gauges, wherein the array of cantilever portions are configured to flexure independently.

In some aspects, the techniques described herein relate to a MEMS densimeter, wherein the array of cantilever portions each define the plurality of microcapillaries.

In some aspects, the techniques described herein relate to a MEMS densimeter, wherein the array of cantilever portions are configured with different resonant frequencies.

In some aspects, the techniques described herein relate to a fuel system including: a MEMS densimeter including: a substrate including a fixed portion and a cantilever portion, wherein the cantilever portion extends from the fixed portion, wherein the cantilever portion is unsupported at a free end opposite to the fixed portion; an inductor disposed on the cantilever portion, wherein the inductor is configured to cause the cantilever portion to flexure relative to the fixed portion; a strain gauge disposed at an interface between the fixed portion and the cantilever portion; and a plurality of bond pads disposed on the fixed portion, wherein the plurality of bond pads are configured to input an alternating current to the inductor, wherein the plurality of bond pads are configured to receive a strain measurement from the strain gauge; wherein the cantilever portion defines a plurality of microcapillaries through at least a portion of a thickness of the cantilever portion, wherein the plurality of microcapillaries are aligned with the flexure; a fluid tank, wherein the fixed portion is fixed to the fluid tank; and a fluid, wherein the fluid tank holds the fluid, wherein the cantilever portion is submerged within the fluid.

In some aspects, the techniques described herein relate to a MEMS densimeter including: a substrate including a fixed portion and a cantilever portion, wherein the cantilever portion extends from the fixed portion, wherein the cantilever portion is unsupported at a free end opposite to the fixed portion, wherein the cantilever portion includes a top cantilever portion and a bottom cantilever portion which each extend from the fixed portion; a pair of inductors, wherein a top inductor of the pair of inductors is disposed on the top cantilever portion, wherein a bottom inductor of the pair of inductors is disposed on the bottom cantilever portion, wherein the top inductor is configured to cause the top cantilever portion to flexure relative to the fixed portion, wherein the bottom inductor is configured to cause the bottom cantilever portion to flexure relative to the fixed portion; a pair of strain gauges, wherein a top strain gauge of the pair of strain gauges is disposed on a top surface of the substrate at an interface between the fixed portion and the top cantilever portion, wherein a bottom strain gauge of the pair of strain gauges is disposed on a bottom surface of the substrate at an interface between the fixed portion and the bottom cantilever portion; and a plurality of bond pads disposed on the fixed portion, wherein the plurality of bond pads are configured to input an alternating current to the pair of inductors, wherein the plurality of bond pads are configured to receive strain measurements from the pair of strain gauges; wherein the cantilever portion defines a plate microcapillary between the top cantilever portion and the bottom cantilever portion.

In some aspects, the techniques described herein relate to a MEMS densimeter, wherein the plate microcapillary is defined from the free end up to the fixed portion.

In some aspects, the techniques described herein relate to a MEMS densimeter, wherein the plate microcapillary is defined through a width of the cantilever portion.

In some aspects, the techniques described herein relate to a MEMS densimeter, wherein the MEMS densimeter is configured to control a phase of alternating current through the top inductor and a phase of alternating current through the bottom inductor such that the top cantilever portion and the bottom cantilever portion flexure synchronously.

BRIEF DESCRIPTION OF THE DRAWINGS

Implementations of the concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1A:
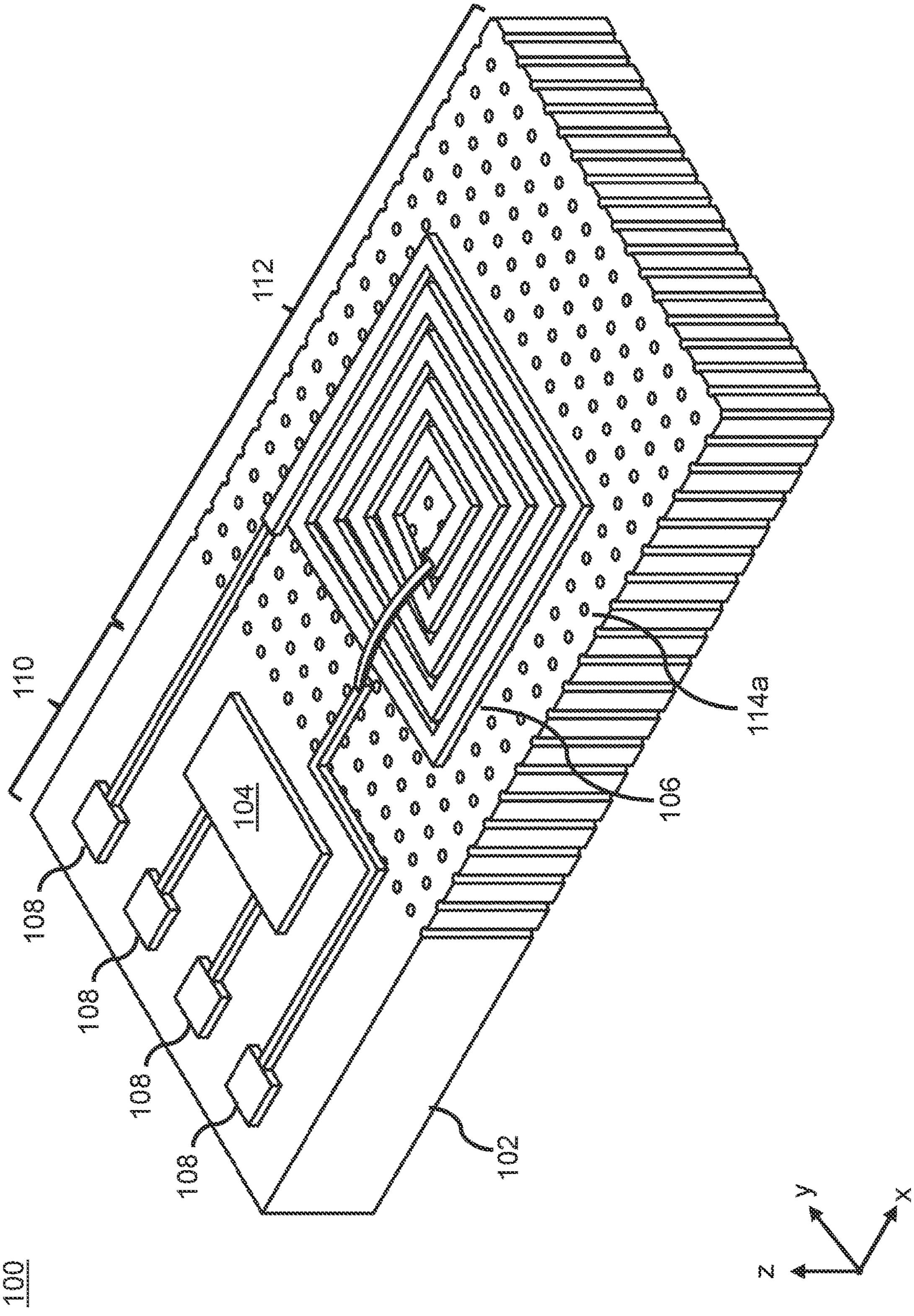
FIGS. 1A-1C depict a perspective, top, and side view, respectively, of a MEMS densimeter with through-hole microcapillaries, in accordance with one or more embodiments of the present disclosure.
Figure 1B:
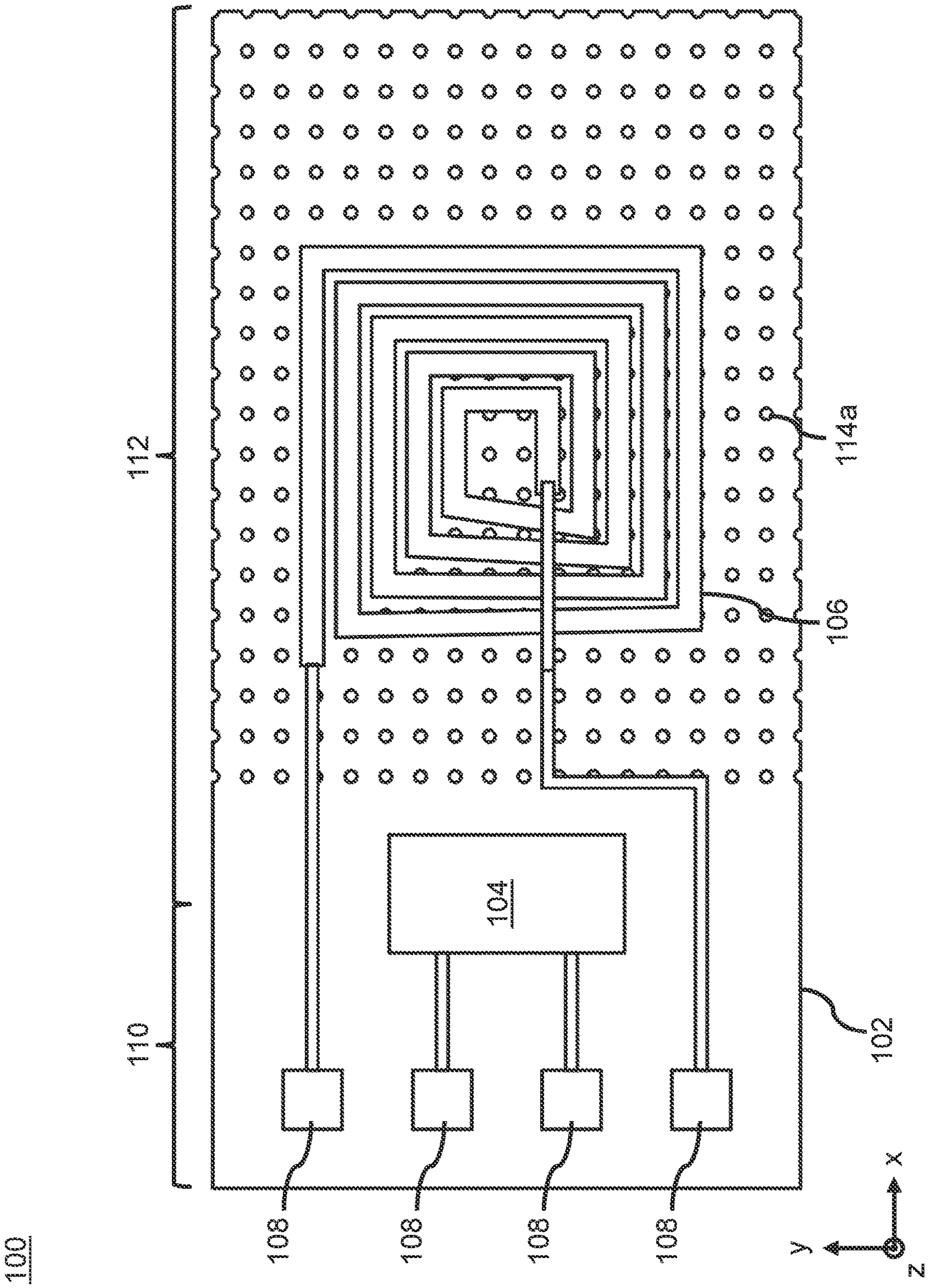
Figure 1C:
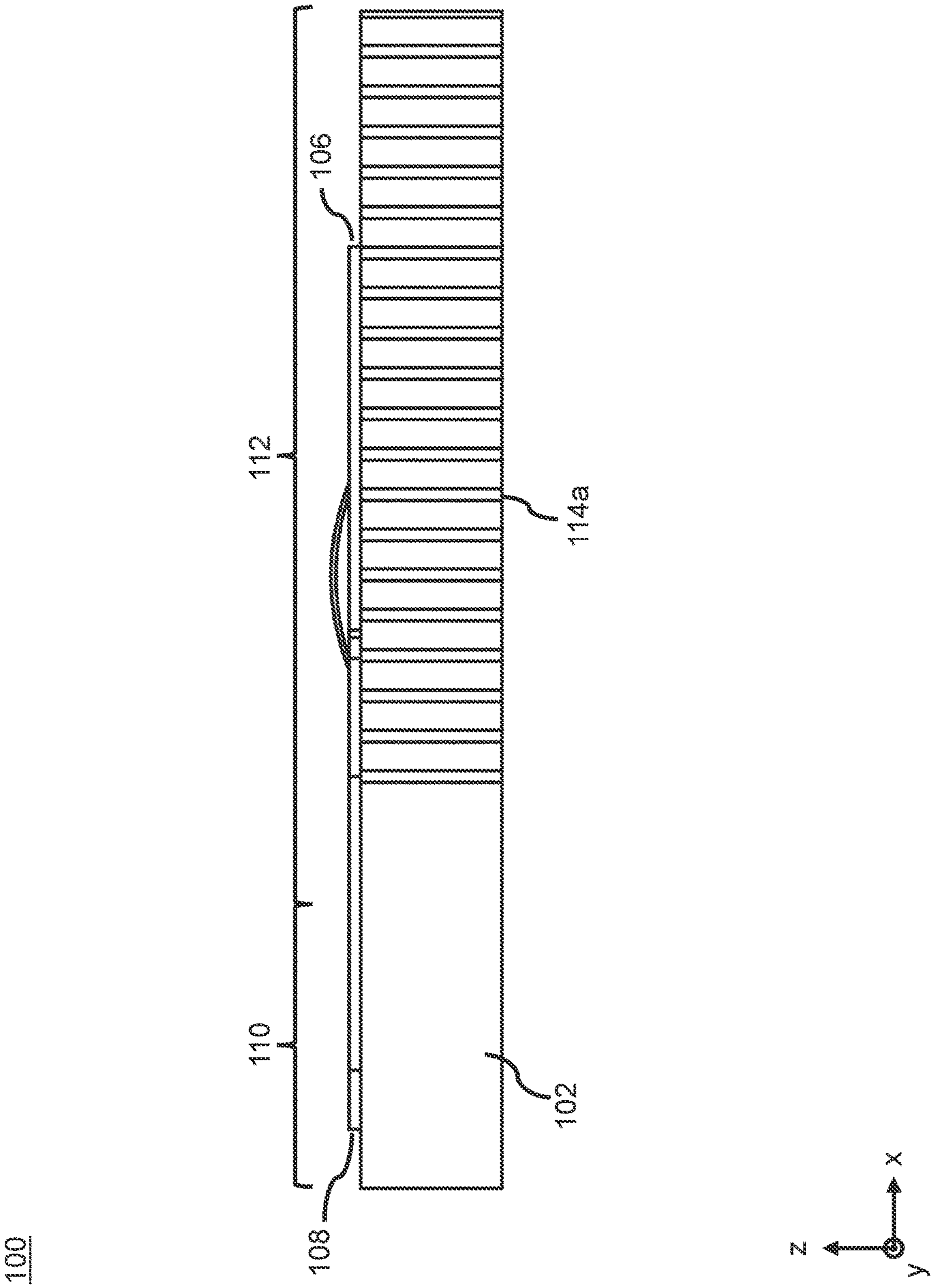
Figure 2A:
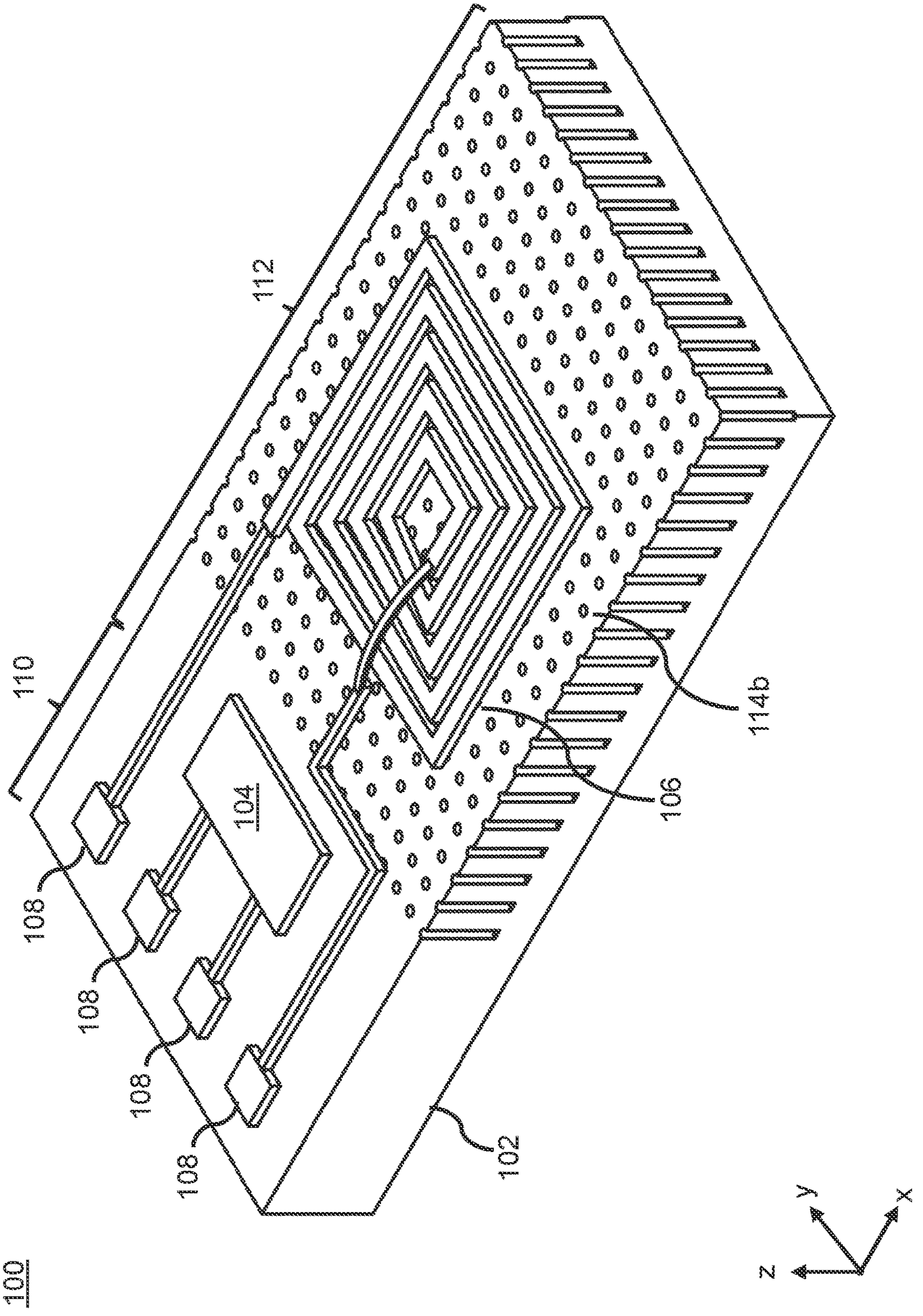
FIGS. 2A-2C depict a perspective, top, and side view of the MEMS densimeter with blind-hole microcapillaries, in accordance with one or more embodiments of the present disclosure.
Figure 2B:
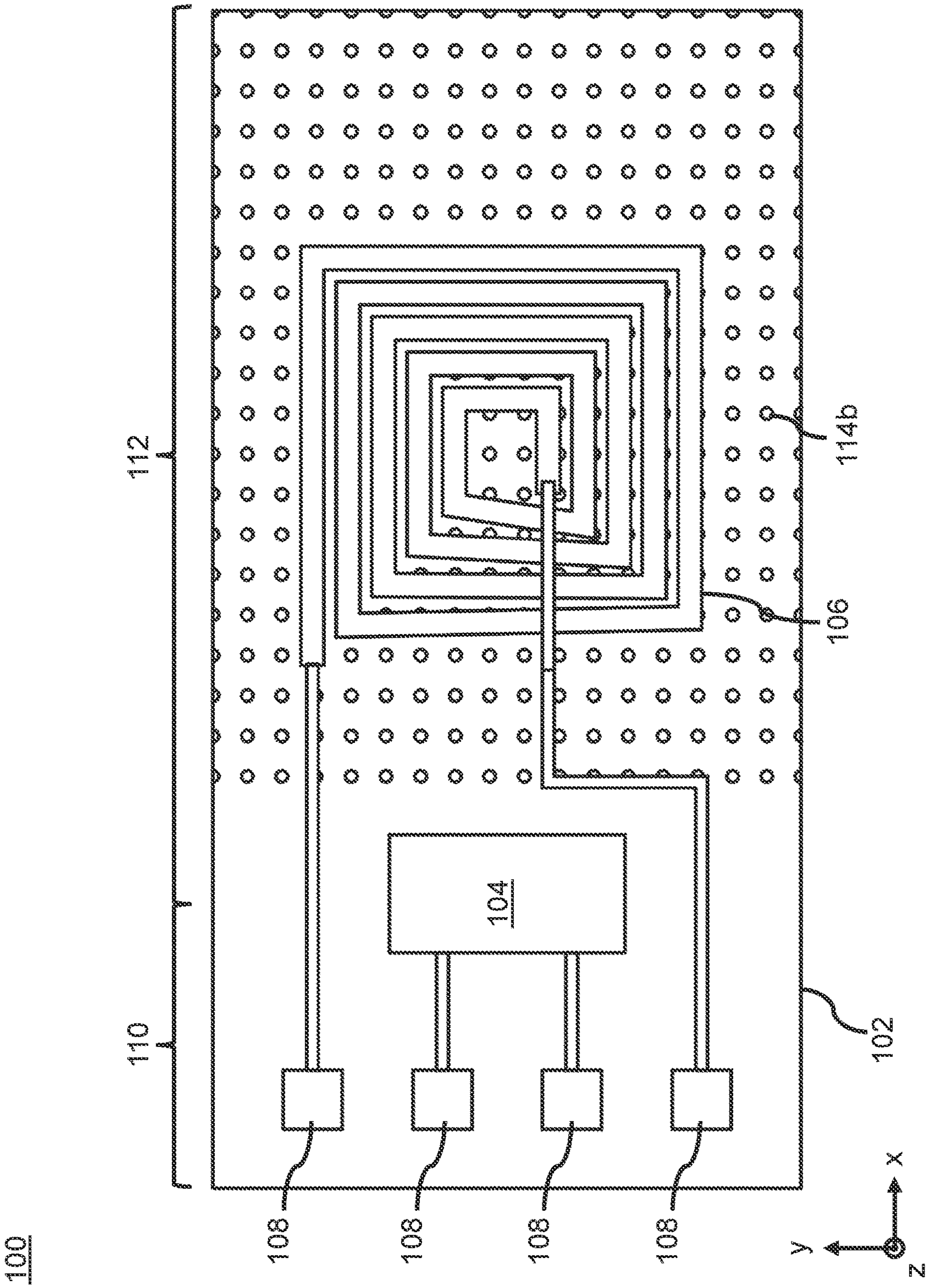
Figure 2C:
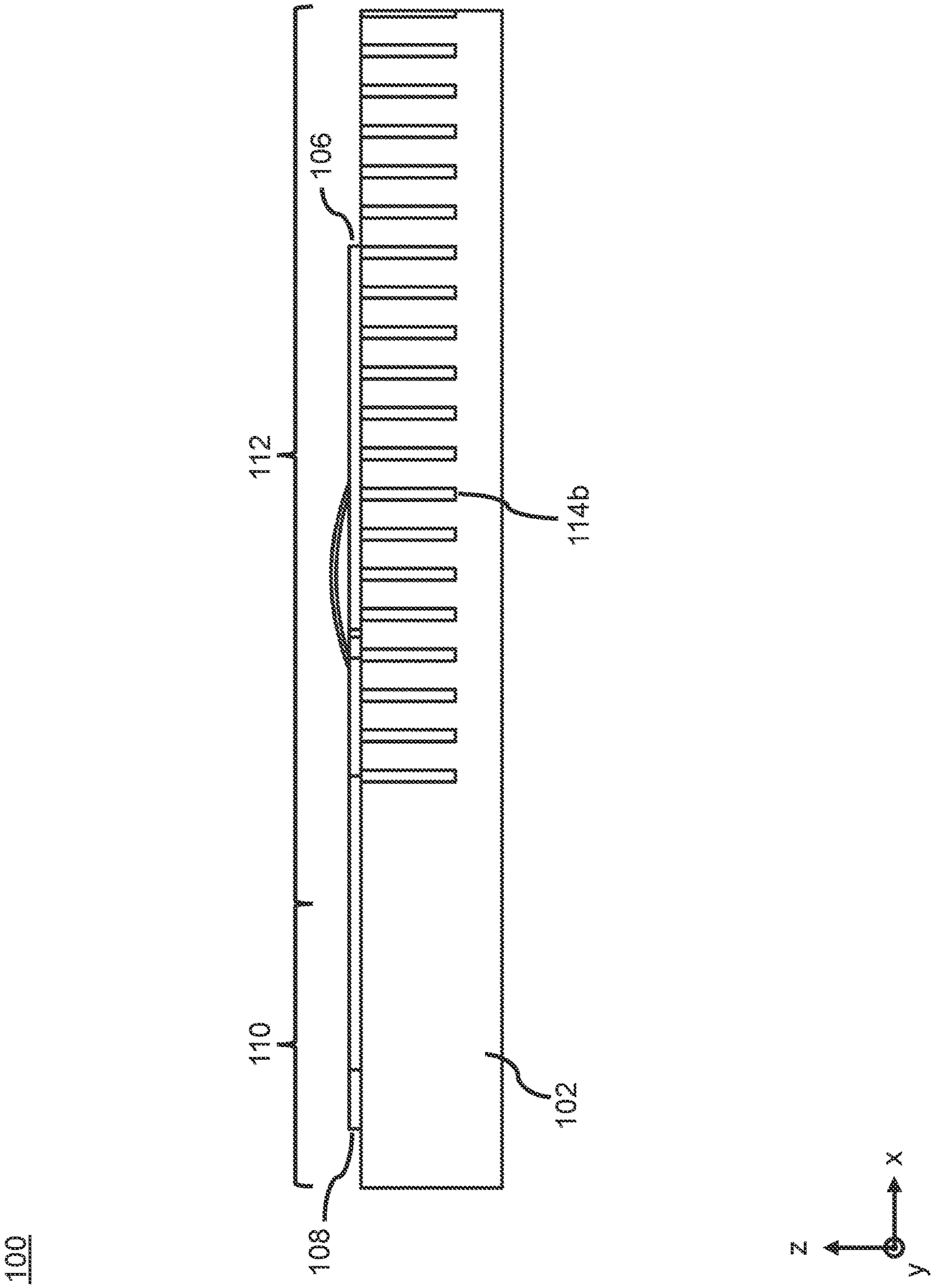
Figure 3A:
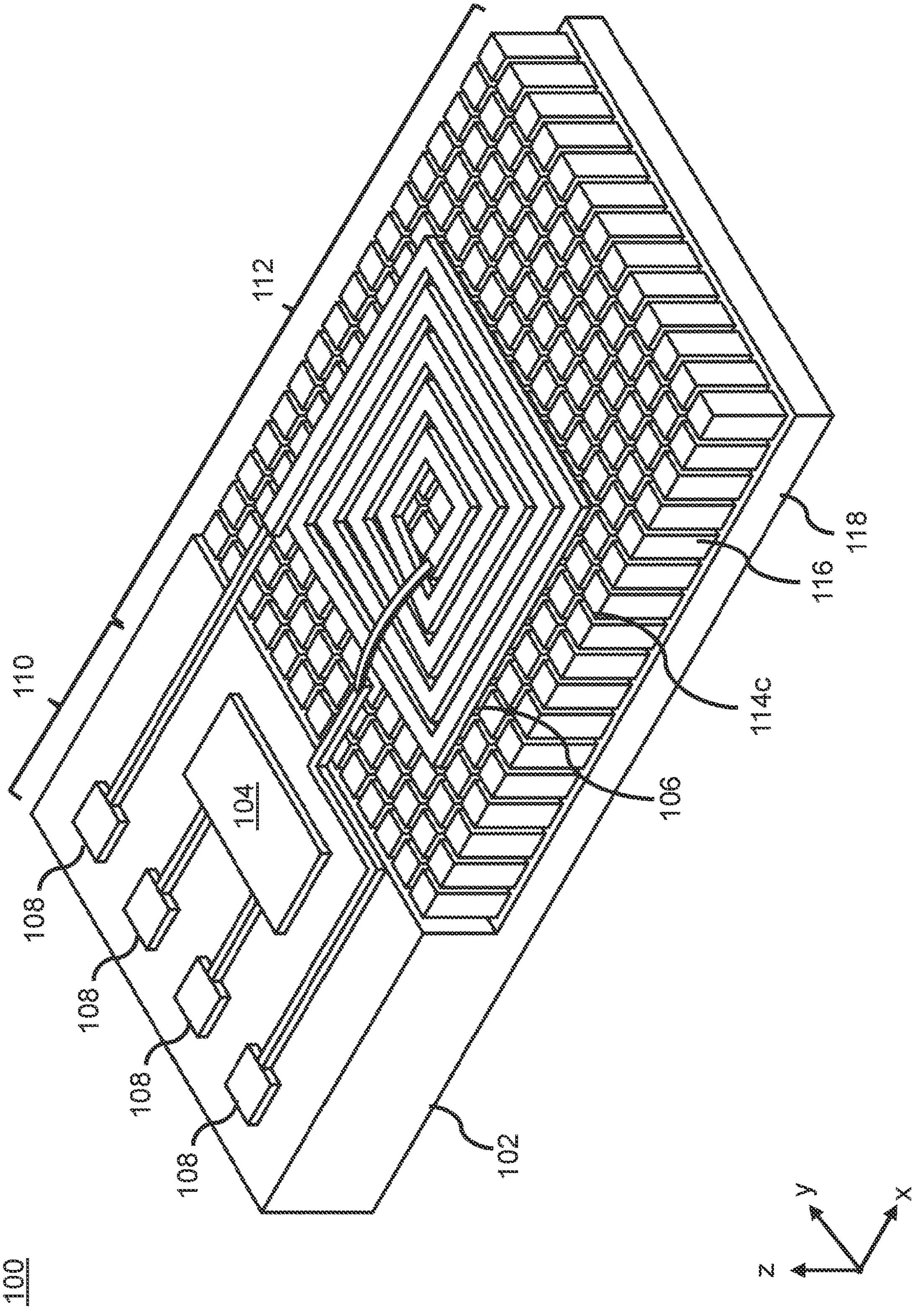
FIGS. 3A-3C depict a perspective, top, and side view, respectively, of the MEMS densimeter with grid microcapillaries, in accordance with one or more embodiments of the present disclosure.
Figure 3B:
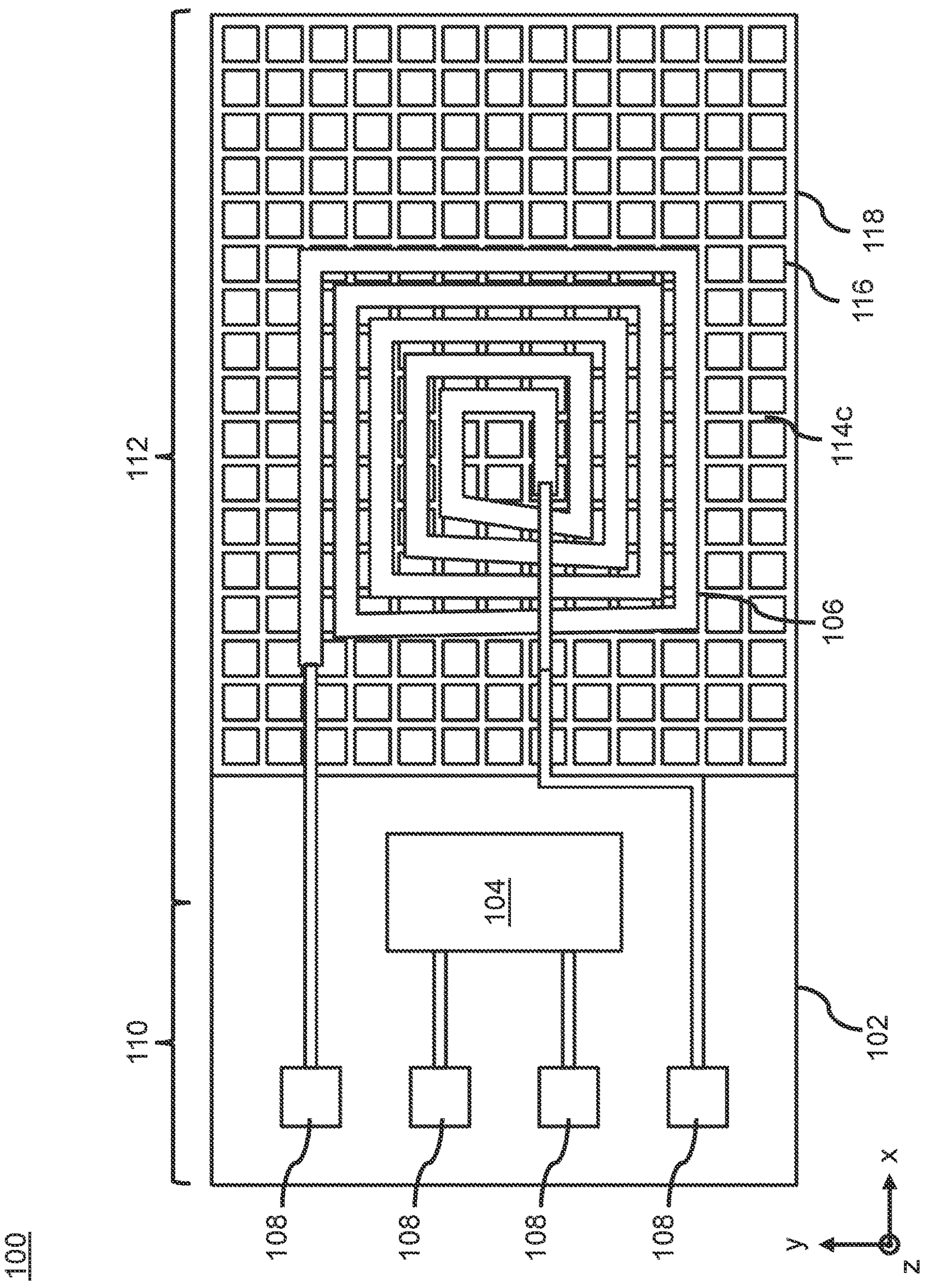
Figure 3C:
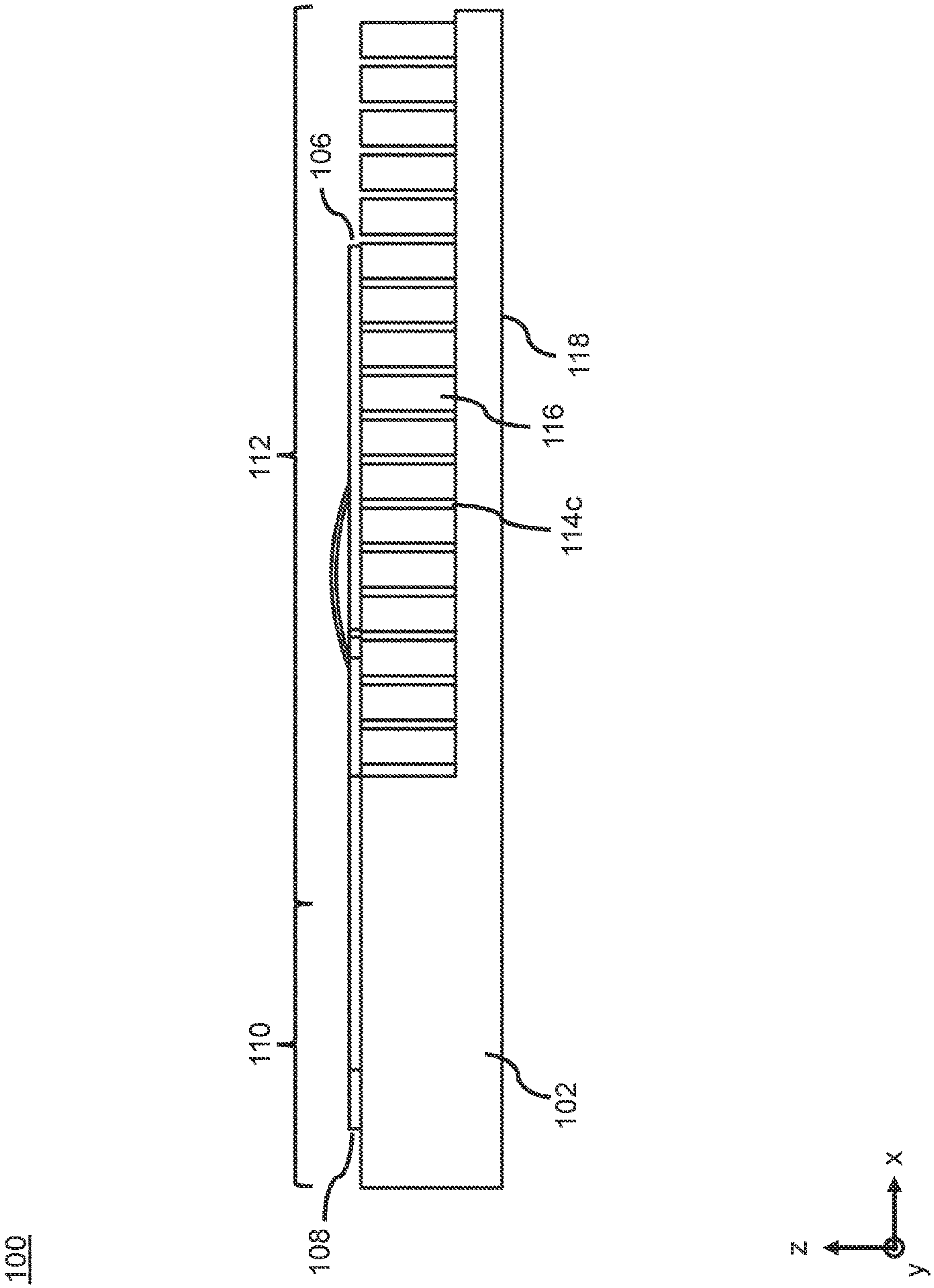

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details are set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1*a*, 1*b*). Such shorthand notations are used for purposes of convenience only and should not be construed to limit the disclosure in any way unless expressly stated to the contrary.

Further, unless expressly stated to the contrary, “or” refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of “a” or “an” may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Reference will now be made in detail to the subject matter disclosed, which is illustrated in the accompanying drawings. A MEMS densimeter may include a cantilever portion defining one or more microcapillaries. The microcapillaries may provide an enhanced response to the fluid density. The microcapillaries may include microcapillaries which are aligned with flexure of the cantilever portion, such as through-hole microcapillaries, blind-hole microcapillaries, and grid microcapillaries. The microcapillaries may also include a plate microcapillary aligned normal to the flexure of the cantilever portion.

U.S. Pat. No. 11,692,895B2, titled "Differential pressure sensor"; U.S. Pat. No. 11,649,158B2, titled "Piezoelectric MEMS device with cantilever structures"; U.S. Patent Publication Number US20090120168A1, titled "Microfluidic downhole density and viscosity sensor"; U.S. Pat. No. 8,438,919B2, titled "Systems and methods for liquid level sensing having a differentiating output"; U.S. Pat. No. 8,141,427B2, titled "Piezoelectric and piezoresistive cantilever sensors"; are incorporated herein by reference in the entirety.

FIGS. 1A-3C depict a MEMS densimeter 100, in accordance with one or more embodiments of the present disclosure. The MEMS densimeter 100 may be a micro-electro-mechanical system (MEMS) densimeter, a MEMS cantilever densimeter, and/or a MEMS cantilever densimeter with fluid trapping microcapillaries. The MEMS densimeter 100 may be fabricated using MEMS processes (including deposition, patterning, lithography, and etching processes). The MEMS densimeter 100 may include one or more of a substrate 102, a strain gauges 104, inductors 106, bond pads 108, and the like.

The substrate 102 may be made of a material, such as silicon, glass, quartz, or the like. The substrate 102 may be a planar member. The substrate 102 may be flat along a horizontal plane. The substrate 102 may include a uniform thickness, such that the substrate 102 may be thinner than wide or long. The substrate 102 may include a top surface and/or a bottom surface. The substrate 102 may not include any significant curvature along the horizontal plane before flexure. The substrate 102 may include a shape, such as, but not limited to, a rectangular shape.

The substrate 102 may include a fixed portion 110 and/or a cantilever portion 112. The fixed portion 110 and the cantilever portion 112 may share the top surface and the bottom surface.

The fixed portion 110 may be fixed. For example, the fixed portion 110 may be fixed to a fluid tank or the like. The fixed portion 110 may be fixed such that the fixed portion 110 does not undergo deflection when the cantilever portion 112 vertically about the fixed portion 110.

The cantilever portion 112 may also be referred to a flexure, suspension beam, cantilever beam, or the like. The cantilever portion 112 may extend from the fixed portion 110. The cantilever portion 112 may be a structure which projects beyond the fixed portion 110. The cantilever portion 112 may be supported at a fixed end by the fixed portion 110. The cantilever portion 112 may be unsupported at a free end opposite to the fixed portion 110. The cantilever portion 112 may be counterbalanced and/or supported only at the fixed end.

The fixed portion 110 and/or the cantilever portion 112 may include a shape. The shape may refer to a shape from the top and/or bottom of the substrate 102. For example, the shape may be in the x-y plane. The shape may include a rectangular shape, a trapezoidal shape, and the like. The fixed portion 110 and/or the cantilever portion 112 may include a length, width, and thickness. The length, width, and thickness may refer to distances along the x-axis, y-axis, and z-axis, respectively. The length of the cantilever portion 112 may be larger than the width of the cantilever portion 112. The length and/or width may be on the order of millimeters. The length and/or width of the cantilever portion 112 may be much larger than the thickness of the cantilever portion 112. The thickness may be on the order of nanometers.

The inductors 106 may be disposed on substrate 102. For example, the inductors 106 may be disposed on the cantilever portion 112. The inductors 106 may be disposed on a top surface and/or a bottom surface of the cantilever portion 112. The MEMS densimeter 100 may include at least one of the inductors 106. For example, the MEMS densimeter 100 may include one of the inductors 106. The one of the inductors 106 may be disposed on either the top surface or the bottom surface of the cantilever portion 112. By way of another example, the MEMS densimeter 100 may include a pair of the inductors 106. A top inductor of the pair of the inductors 106 may be disposed on the top surface and a bottom inductor of the pair of inductors 106 may be disposed on the bottom surface of the cantilever portion 112.

The inductors 106 may be configured to receive an alternative current. For example, the inductors 106 may receive an alternating current from the bond pads 108. The alternating current may cause the inductors 106 to generate a magnetic field. A direction of the magnetic field may be normal to the cantilever portion 112. The magnetic field generated by the inductors 106 may then cause the cantilever portion 112 to flex in the presence of an external fixed magnetic field (not shown). The external magnetic field may be supplied by a magnet, such as a permanent magnet. The inductors 106 may be configured to actuate the cantilever portion 112. For example, the inductors 106 may be configured to actuate the cantilever portion 112 by generating the magnetic field which flexures the cantilever portion 112 relative to the fixed portion 110.

The inductors 106 may be configured to cause the cantilever portion 112 to flexure relative to the fixed portion 110. For example, the flexure of the cantilever portion 112 relative to the fixed portion 110 may be about the z-axis. The flexure may also be referred to as vertical deflection. The flexure may carry a load primarily in bending. The flexure may include about an axis normal to the substrate 102. The cantilever portion 112 may move along the perpendicular axis to the substrate 102. The cantilever portion 112 may store and release mechanical energy by deformation resulting in vibration.

The cantilever portion 112 may also experience shear, extension, and/or torsion relative to the fixed portion 110. The shear of the cantilever portion 112 relative to the fixed portion may be along the y-axis. The shear may also be referred to as horizontal deflection. The extension of the cantilever portion 112 relative to the fixed portion may be along the x-axis. The torsion of the cantilever portion 112 relative to the fixed portion may be rotation about the z-axis. It is contemplated that the primary mode of deflection may be the flexure about the fixed portion, such that the shear, torsion, and/or extension are not described further herein.

A maximum deflection of the cantilever portion 112 during flexure may be at the free end of the cantilever portion 112. A minimum deflection of the cantilever portion 112 during flexure may be at the fixed end of the cantilever portion 112.

The flexure of the cantilever portion 112 may induce a strain in the fixed portion 110. The strain in the fixed portion 110 may correspond to the magnitude of the flexure of the cantilever portion 112.

The strain gauges 104 may be disposed on the substrate 102. The strain gauges 104 may be disposed on the fixed portion 110 and/or the cantilever portion 112. For example, the strain gauges 104 may be disposed on both the fixed portion 110 and the cantilever portion 112. For instance, the strain gauges 104 may be disposed at an interface between the fixed portion 110 and the cantilever portion 112 from which the cantilever portion 112 extends from the fixed portion 110. The strain may be at a maximum at the interface between the fixed portion 110 and the cantilever portion 112.

The strain gauges 104 may be disposed on a top surface and/or a bottom surface of the substrate 102. The strain gauges 104 may be disposed on a same side and/or a different side as the inductors 106. The MEMS densimeter 100 may include at least one of the strain gauges 104. For example, the MEMS densimeter 100 may include one of the strain gauges 104. The one of the strain gauges 104 may be disposed on either the top surface or the bottom surface of the substrate 102. By way of another example, the MEMS densimeter 100 may include a pair of the strain gauges 104. A top strain gauge of the pair of strain gauges 104 may be disposed on the top surface of the substrate 102 at the interface and a bottom strain gauge of the pair of strain gauges 104 may be disposed on the bottom surface of the substrate 102 at the interface.

The strain gauges 104 may be configured to measure the strain in the fixed portion 110 induced by the flexure of cantilever portion 112. The strain gauges 104 may include any sensor configured to measure the strain. For example, the strain gauges may include a strain sensitive pattern and a Wheatstone bridge. A resistance of the strain sensitive pattern may be sensitive to strain induced by flexure of the cantilever portion 112. The Wheatstone bridge may measure the resistance of the strain sensitive pattern. The resistance may be a measure of the strain. Thus, the flexure of the cantilever portion 112 may cause the strain gauges 104 to measure the strain.

The strain gauges 104 may be made of a piezoelectric material, such as, but not limited to, aluminum nitride, lead zirconate titanate (PZT), or the like.

The bond pads 108 may be wire-bond pads, contact pads, solder pads, landing pads, and the like. The bond pads 108 may be disposed on substrate 102. For example, the bond pads 108 may be disposed on the fixed portion 110. The bond pads 108 may be disposed on a top surface and/or a bottom surface of the fixed portion 110.

The bond pads 108 may be configured to input signals to and/or output signals from the MEMS densimeter 100. The bond pads 108 may be configured to input the alternating current to the inductors 106. The bond pads 108 may be configured to receive a strain measurement from the strain gauges 104. The bond pads 108 may be electrically connected to the strain gauges 104 and/or the inductors 106. The bond pads 108 may be electrically connected to the strain gauges 104 and/or the inductors 106 via one or more interconnects. The interconnects may be an electrically conducting element for transmitting the alternating current signal between the bond pads 108 and the inductors 106 and/or transmitting the measurement of the strain between the bond pads 108 and the strain gauges 104. The interconnects that may be formed on, in or through the substrate 102 or any element formed on the substrate 102. The interconnects may include one or more wire bonds, traces, vias, and the like. The bond pads 108 may be disposed on a same surface or an opposite surface as the strain gauges 104 and/or the inductors 106.

The cantilever portion 112 may be configured to flexure at a resonant frequency. The resonant frequency may be based on a width, length, density, and/or modulus of elasticity of the cantilever portion 112. For example, the resonant frequency may be proportional to the width and the modulus of elasticity and/or inversely proportional to the length, and the density.

A magnitude of the strain to which the fixed portion 110 experiences due to the flexure of the cantilever portion 112 may be highest when the cantilever portion flexures at the resonant frequency. Thus, the strain gauges 104 may measure a maximum strain when the cantilever portion 112 vibrates at the resonant frequency.

The cantilever portion 112 may be configured to be submerged in a liquid. The liquid may damp the cantilever portion 112. A density of fluid in which the cantilever portion 112 is submerged may change the resonant frequency at which the cantilever portion 112 is configured to flexure. As the density of the fluid changes, the mass of the cantilever portion 112 changes and thus the resonant frequency changes. The resonant frequency may be inversely proportional to the density of the fluid. For instance, the resonant frequency squared may be inversely proportional to the mass. The resonant frequency may decrease with increasing density because of an added mass within which the cantilever portion 112 flexures.

The substrate 102 may define microcapillaries 114. For example, the cantilever portion 112 may define the microcapillaries 114. The microcapillaries 114 may be defined through at least a portion of the thickness of the cantilever portion 112. For example, the microcapillaries 114 may be defined from a top surface and/or a bottom surface of the cantilever portion 112.

The microcapillaries 114 may be aligned with the flexure of the cantilever portion 112. The microcapillaries 114 may also be aligned normal to the horizontal plane of the substrate 102. For example, the microcapillaries 114 may be aligned vertically and/or along the z-axis.

The cantilever portion 112 may define the microcapillaries 114 at the free end of the cantilever portion 112. The cantilever portion 112 may define the microcapillaries 114 between the free end of the cantilever portion 112 and the cantilever portion 112.

The cantilever portion 112 may define the microcapillaries 114 along one or more edges of the cantilever portion 112. For example, the cantilever portion 112 may define the microcapillaries 114 along the edges of the cantilever portion 112 at the free end of the cantilever portion 112 and/or along the edges of the cantilever portion 112 between the free end of the cantilever portion 112 and the cantilever portion 112.

The microcapillaries 114 may be fabricated by a micro-machining process. For example, the microcapillaries 114 may be fabricated by deep reactive ion etching, anisotropic etching, Potassium Hydroxide (KOH) etching, or another micro-machining process.

The cantilever portion 112 may define the microcapillaries 114 around the inductors 106. For example, the inductors 106 may include a rectangular perimeter around which the microcapillaries 114 may be defined.

The cantilever portion 112 may or may not define the microcapillaries 114 below the inductors 106. For example, the cantilever portion 112 is depicted as defining the microcapillaries 114 below the inductors 106, although this is not intended as a limitation of the present disclosure. In embodiments, the inductors 106 may be formed on the cantilever portion 112 and then the cantilever portion 112 may be etched to define the microcapillaries 114 such that the microcapillaries 114 may not be disposed below the inductors 106.

A size of the microcapillaries 114 may be micrometer scale. The size of the microcapillaries 114 may refer to a distance between adjacent-most surfaces of the cantilever portion 112 which define the microcapillaries 114.

The microcapillaries 114 may include a depth. The depth of the microcapillaries 114 may be through a portion of the cantilever portion 112 and/or through all the cantilever portion 112.

The microcapillaries 114 may include an aspect ratio. The aspect ratio may be the depth of the microcapillaries 114 relative to the size of the microcapillaries 114. For example, the aspect ratio may be the depth of the microcapillaries 114 relative to the distance between adjacent-most surfaces of the cantilever portion 112 which define the microcapillaries 114.

The microcapillaries 114 may be arranged in a lattice. The lattice may also be referred to as an array. The lattice may include a repeating pattern of the microcapillaries 114 along the length and/or width of the cantilever portion 112. The cantilever portion 112 may define any lattice of the microcapillaries 114, such as, but not limited to, an oblique lattice, a rectangular lattice, a square lattice (as depicted), or the like.

The lattice may include a density. The density of the lattice may be based on the spacing between adjacent of the microcapillaries in the lattice. The density of the lattice may be increased to increase the number of the microcapillaries 114 defined by the cantilever portion 112. The cantilever portion 112 may define tens or hundreds of the microcapillaries 114 in the lattice along the length and/or the width of the cantilever portion 112. The size of the microcapillaries 114 may be the same or vary across the lattice. For example, the size of the microcapillaries 114 may include a size gradient (not depicted) which increases from the fixed end to the free end.

Although the microcapillaries 114 are described as being arranged in the lattice, this is not intended as a limitation of the present disclosure. It is contemplated that the microcapillaries 114 may be arranged in a non-repeating pattern.

The microcapillaries 114 may include a volume. The volume may be based on the size of the microcapillaries 114, the depth of the microcapillaries 114, and the number of the microcapillaries 114.

The microcapillaries 114 may be fluid trapping microcapillaries. The microcapillaries 114 may be configured to trap a fluid. The microcapillaries 114 may be configured to trap the fluid within the volume of the microcapillaries 114 as the cantilever portion 112 flexures. The volume of the fluid trapped within the microcapillaries 114 may be based on the volume of the microcapillaries 114. A mass of the fluid trapped within the microcapillaries 114 may be based on the volume of the microcapillaries 114 and the density of the fluid. The mass of the fluid trapped within the microcapillaries 114 may be added to the mass of the cantilever portion 112.

The microcapillaries 114 disposed at the free end of the cantilever portion 112 may experience the maximum deflection and thereby provide maximum damping due to the added mass of the fluid. The microcapillaries disposed between the free end and the fixed end of the cantilever portion 112 may experience less deflection than the free end thereby providing less damping due to the added mass of the fluid.

The microcapillaries 114 may include through-hole microcapillaries 114*a*, blind-hole microcapillaries 114*b*, and/or grid microcapillaries 114*c*. The cantilever portion 112 may define any combination of the through-hole microcapillaries 114*a*, the blind-hole microcapillaries 114*b*, and/or the grid microcapillaries 114*c*.

The through-hole microcapillaries 114*a* may be defined through the thickness of the cantilever portion 112. The through-hole microcapillaries 114*a* may open on both surfaces of the cantilever portion 112. For example, the through-hole microcapillaries 114*a* may be defined from the top surface of the cantilever portion 112, through the thickness of the cantilever portion 112, to the bottom surface of the cantilever portion 112.

The blind-hole microcapillaries 114*b* and/or the grid microcapillaries 114*c* may be defined through the portion of the thickness of the cantilever portion 112. The blind-hole microcapillaries 114*b* and/or the grid microcapillaries 114*c* may not be defined through the entire thickness of the cantilever portion 112. For example, the blind-hole microcapillaries 114*b* and/or the grid microcapillaries 114*c* may be defined from the top surface of the cantilever portion 112, through the portion of the thickness of the cantilever portion 112, with a remainder of the thickness of the cantilever portion 112 up to the bottom surface of the cantilever portion 112 not including the blind-hole microcapillaries 114*b* and/or the grid microcapillaries 114*c*. Thus, the blind-hole microcapillaries 114*b* and/or the grid microcapillaries 114*c* may be open to the top surface but not open to the bottom surface.

The through-hole microcapillaries 114*a* and/or the blind-hole microcapillaries 114*b* may be configured for fluid flow in one-dimension. For example, the through-hole microcapillaries 114*a* and/or the blind-hole microcapillaries 114*b* may be configured for fluid flow in lines along the z-axis.

The through-hole microcapillaries 114*a* and/or the blind-hole microcapillaries 114*b* may include a selected shape. For example, the through-hole microcapillaries 114*a* and/or the blind-hole microcapillaries 114*b* may include a circular shape, a triangular shape, a square shape, or another polygonal shape. It is contemplated that the circular shapes may be beneficial to provide ease-of-manufacturing and/or a larger effective radius in which to trap the liquid.

The grid microcapillaries 114*c* may be defined in a grid pattern. The grid microcapillaries 114*c* may be arranged in the lattice.

The cantilever portion 112 may include pillars 116 and/or a base 118. The base 118 of the cantilever portion 112 may extend from the fixed portion 110. A thickness of the base 118 may be less than the thickness of the fixed portion 110. The base 118 may be a structure which projects beyond the fixed portion 110. The base 118 may be supported at a fixed end by the fixed portion 110. The base 118 may be unsupported at a free end opposite to the fixed portion 110. The base 118 may be counterbalanced and/or supported only at the fixed end.

The pillars 116 may be micro-machined pillars, columns, extending structures, or the like. The pillars 116 may extend from the base 118. The pillars 116 may extend from the base 118 in the direction of flexure. For example, the pillars 116 may extend along the z-axis. The pillars 116 may include a thickness. The thickness of the pillars 116 may define the depth of the grid microcapillaries 114*c*. The thickness of the cantilever portion 112 may be the sum of the thickness of the base 118 and the thickness of the pillars 116. The pillars 116 may be supported by the base 118. The pillars 116 may not be adjoined with adjacent of the pillars 116. For example, where the pillars 116 are adjoined with adjacent of the pillars 116 the blind-hole microcapillaries 114*b* may be defined by the cantilever portion 112 instead of the grid microcapillaries 114*c*.

The pillars 116 of the cantilever portion 112 may define the grid microcapillaries 114*c*. For example, the pillars 116 may define the grid microcapillaries 114*c* in the lattice. The lattice of the grid microcapillaries 114*c* may intersect at the corners of the pillars 116. The pillars 116 may include any suitable shape for defining the grid microcapillaries 114*c* in the lattice, such as, but not limited to, a triangle, a rectangle, a square, a hexagon, or the like. The aspect ratio of the grid microcapillaries 114*c* may be based on the distance between adjacent of the pillars 116.

The grid microcapillaries 114*c* may be configured for fluid flow in three-dimensions. For example, the grid microcapillaries 114*c* may be configured for fluid flow in lines along the x-axis, the y-axis, and/or the z-axis.

Figure 4A:
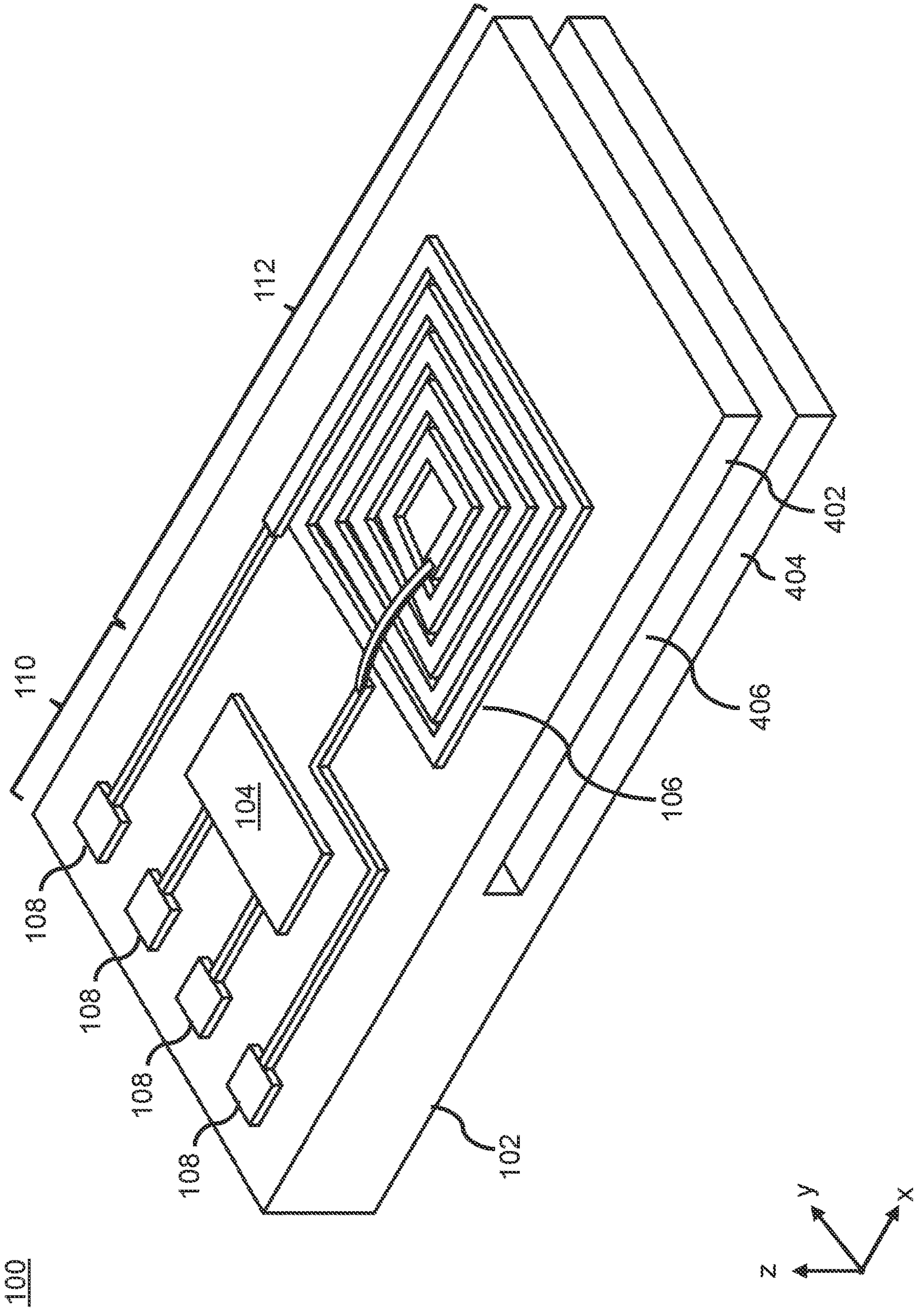
FIGS. 4A-4C depict a perspective, top, and side view, respectively, of the MEMS densimeter with a plate microcapillary, in accordance with one or more embodiments of the present disclosure.
Figure 4B:
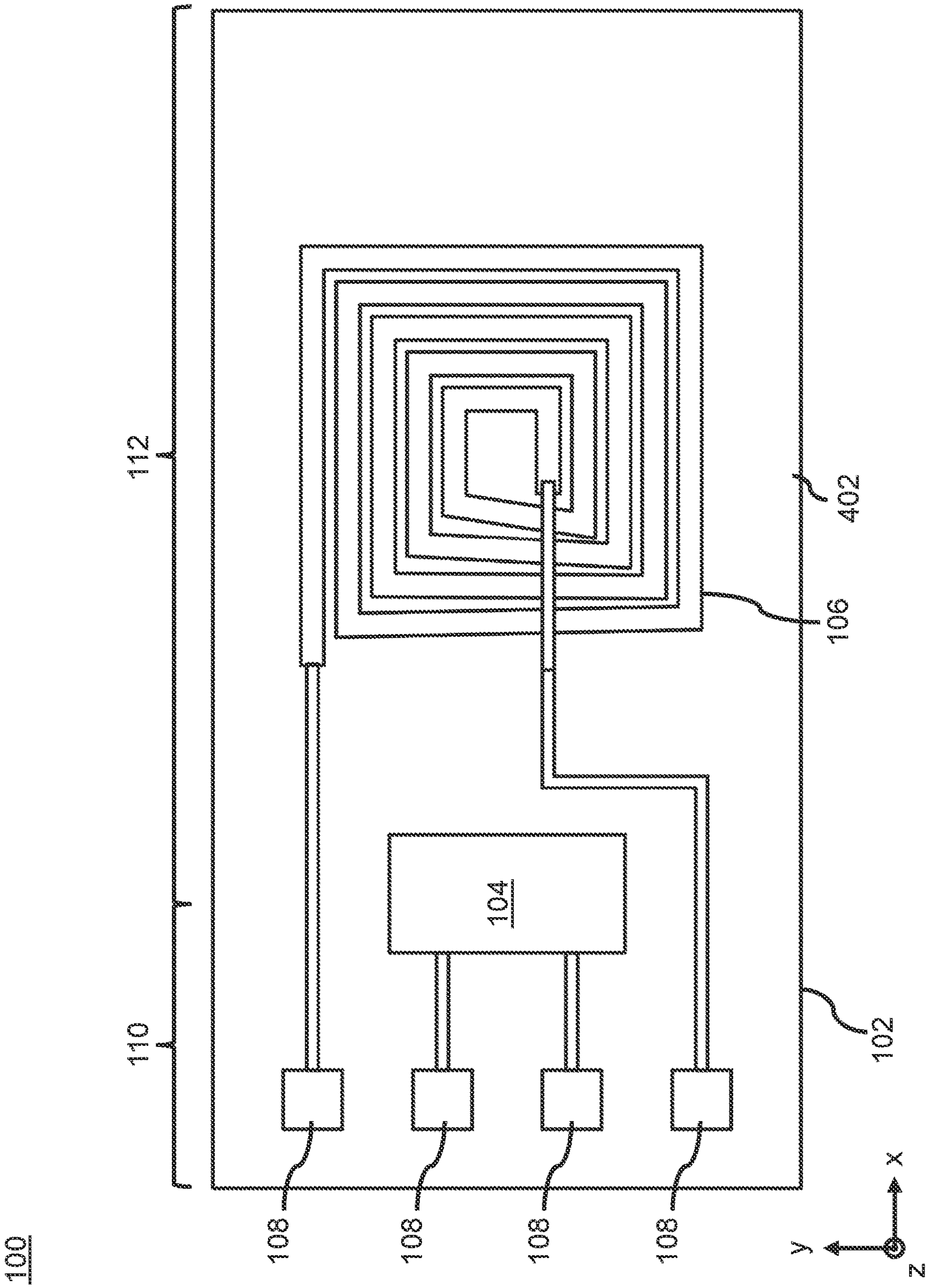
Figure 4C:
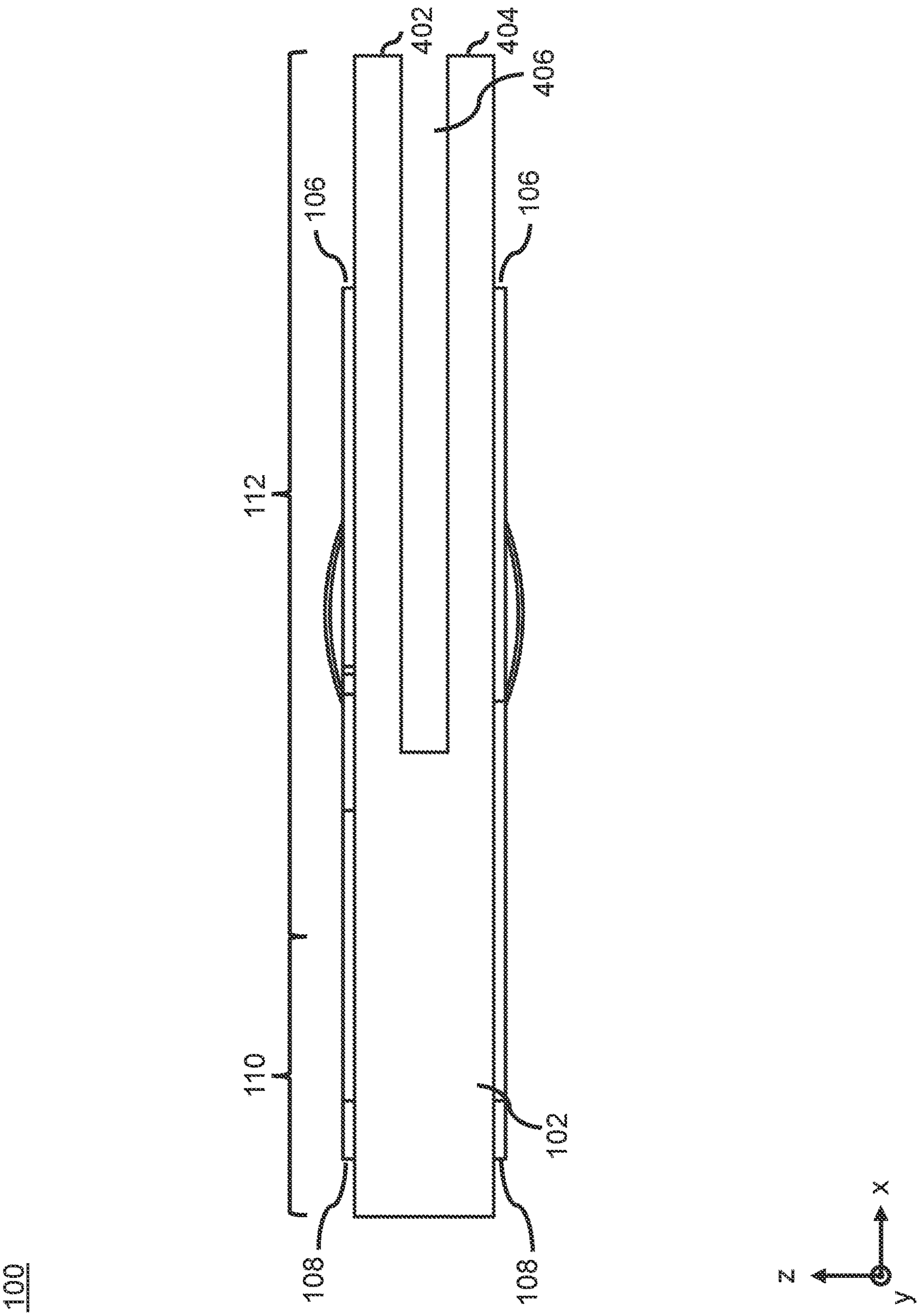

FIGS. 4A-4C depict the MEMS densimeter 100, in accordance with one or more embodiments of the present disclosure. The cantilever portion 112 may include a top cantilever portion 402 and a bottom cantilever portion 404. The top cantilever portion 402 and the bottom cantilever portion 404 may each extend from the fixed portion 110.

The MEMS densimeter 100 may include a pair of the inductors 106. The pair of inductors 106 may be disposed on the cantilever portion 112. A top inductor of the pair of inductors 106 may be disposed on the top cantilever portion 402 and a bottom inductor of the pair of inductors 106 may be disposed on the bottom cantilever portion 404.

The pair of the inductors 106 may be configured to cause the cantilever portion 112 to flexure. The top inductor may be configured to cause the top cantilever portion 402 to flexure relative to the fixed portion 110. The bottom inductor may be configured to cause the bottom cantilever portion 404 to flexure relative to the fixed portion 110.

The MEMS densimeter 100 may be configured to control a phase of the alternating current through the top inductor and the phase of the alternating current through the bottom inductor such that the top cantilever portion 402 and the bottom cantilever portion 404 may flexure synchronously. The top cantilever portion 402 and the bottom cantilever portion 404 may flexure synchronously when each of the top cantilever portion 402 and the bottom cantilever portion 404 flexure in a same direction at a same time. The MEMS densimeter 100 may include a phase-lock-loop (not depicted) for controlling the phase of the alternating current through the top and bottom inductors.

The MEMS densimeter 100 may include the pair of strain gauges 104. A top strain gauge of the strain gauges 104 may be disposed on the top surface of the substrate 102 at the interface between the fixed portion 110 and the top cantilever portion 402. A bottom strain gauge of the pair of strain gauges 104 may be disposed on the bottom surface of the substrate 102 at the interface between the fixed portion 110 and the bottom cantilever portion 404. The top strain gauge and the bottom strain gauge may be configured to measure the strain in the fixed portion 110 induced by the flexure of the top cantilever portion 402 and the bottom cantilever portion 404, respectively.

The bond pads 108 may be configured to input the alternating current to the pair of inductors 106. The bond pads 108 may also be configured to receive strain measurements from the pair of strain gauges 104.

The cantilever portion 112 may define a plate microcapillary 406. The cantilever portion 112 may define the plate microcapillary 406 between the top cantilever portion 402 and the bottom cantilever portion 404.

The plate microcapillary 406 may be defined from the free end of the cantilever portion 112 up to the fixed portion 110. The cantilever portion 112 may define the plate microcapillary 406 below the inductors 106.

The plate microcapillary 406 may be fabricated by a micro-machining process. For example, the plate microcapillary 406 may be fabricated by deep reactive ion etching, anisotropic etching, Potassium Hydroxide (KOH) etching, or another micro-machining process.

A size of the plate microcapillary 406 may be micrometer scale. The size of the plate microcapillary 406 may refer to a distance between the top cantilever portion 402 and the bottom cantilever portion 404 which define the plate microcapillary 406.

The plate microcapillary 406 may include a depth. The depth of the plate microcapillary 406 may be from the free end towards the fixed portion 110. For example, the depth of the plate microcapillary 406 may be from the free end up to the fixed portion 110. In this regard, the depth of the plate microcapillary 406 may be much larger than the depth of the through-hole microcapillaries 114*a*, the blind-hole microcapillaries 114*b*, and/or the grid microcapillaries 114*c*.

The plate microcapillary 406 may include an aspect ratio. The aspect ratio may be the depth of the plate microcapillary 406 relative to the size of the plate microcapillary 406. For example, the aspect ratio may be the depth of the plate microcapillary 406 relative to the distance between the top cantilever portion 402 and the bottom cantilever portion 404 which define the plate microcapillary 406.

The plate microcapillary 406 may be defined through the width of the cantilever portion 112. The plate microcapillary 406 may be defined through the width of the cantilever portion 112 such that the plate microcapillary 406 is open along the free end and opposing edges disposed between the free end and the fixed end. The plate microcapillary 406 may include a width. The width of the plate microcapillary 406, the width of the cantilever portion 112, the width of the top cantilever portion 402, and/or the width of the bottom cantilever portion 404 may be equal.

The plate microcapillary 406 may include a volume. The volume may be based on the size of the plate microcapillary 406, the depth of the plate microcapillary 406, and the width of the plate microcapillary 406.

The plate microcapillary 406 may trap the fluid. The plate microcapillary 406 may be configured to trap the fluid within the volume of the plate microcapillary 406 as the cantilever portion 112 flexures. The volume of the fluid trapped within the plate microcapillary 406 may be based on the volume of the plate microcapillary 406. A mass of the fluid trapped within the plate microcapillary 406 may be based on the volume of the plate microcapillary 406 and the density of the fluid. The mass of the fluid trapped within the plate microcapillary 406 may be added to the mass of the cantilever portion 112.

The plate microcapillary 406 may be aligned normal to the flexure of the cantilever portion 112. The plate microcapillary 406 may also be aligned with the horizontal plane of the substrate 102. For example, the plate microcapillary 406 may be aligned horizontally and/or along the x-y plane.

The plate microcapillary 406 may be configured for fluid flow in two-dimensions. For example, the plate microcapillary 406 may be configured for fluid flow in a horizontal plane (e.g., along the x-y plane).

FIGS. 5A-6B depicts the MEMS densimeter 100, in accordance with one or more embodiments of the present disclosure. The MEMS densimeter 100 may include an array of the cantilever portions 112 which extend from the fixed portion 110. The array of the cantilever portions 112 may include cantilever portion 112-1 through cantilever portion 112-N, where N is an integer. For example, N may be at least two.

The array of the cantilever portions 112 may be configured to flexure independently. For example, each cantilever portion 112 in the array of cantilever portions 112 may be configured to flexure independently of the remainder of the array of the cantilever portions 112.

The MEMS densimeter 100 may include an array of the inductors 106 which are disposed on the array of cantilever portions 112. The array of the inductors 106 may include inductor 106-1 through inductor 106-N, where N is an integer. For example, N may be at least two. The array of the inductors 106 may be configured to cause respective of the array of cantilever portions 112 to flexure relative to the fixed portion 110. For example, the inductor 106-1 through the inductor 106-N may be configured to cause cantilever portion 112-1 through cantilever portion 112-N, respectively, to flexure relative to the fixed portion 110.

The array of the cantilever portions 112 may be spaced from adjacent of the cantilever portions 112 by a gap width. The gap width may be sufficiently large to prevent resonant coupling of the cantilever portions 112 to adjacent of the cantilever portions 112 via the fluid in which the cantilever portions 112 is submerged. The gap width may be larger than the boundary layer of the fluid. For example, the gap width may be larger than the size of the microcapillaries 114, where the cantilever portions 112 define the cantilever portions 112.

The MEMS densimeter 100 may include an array of the strain gauges 104. The array of the strain gauges 104 may include strain gauge 104-1 through strain gauge 104-N, where N is an integer. For example, N may be at least two. The array of the strain gauges 104 may be disposed at the interface between the fixed portion 110 and respective of the array of the cantilever portions 112. For example, the strain gauge 104-1 through strain gauge 104-N may be disposed at the interface between the fixed portion 110 and the cantilever portion 112-1 through cantilever portion 112-N, respectively. The array of the strain gauges 104 may measure the strain induced in the fixed portion 110 by flexure of respective of the array of the cantilever portions 112. For example, the strain gauge 104-1 through strain gauge 104-N may measure the strain induced by flexure of the cantilever portion 112-1 through cantilever portion 112-N, respectively.

The array of the cantilever portions 112, the array of inductors 106, and/or the array of the strain gauges 104 may be linear arrays. The linear arrays may be disposed along the width of the fixed portion 110. For example, the linear arrays extend along the y-axis.

The array of the cantilever portions 112 may each define the microcapillaries 114 (e.g., the through-hole microcapillaries 114*a*, the blind-hole microcapillaries 114*b*, the grid microcapillaries 114*c*) and/or the plate microcapillary 406. The array of the cantilever portions 112 may include permutations defining the through-hole microcapillaries 114*a*, the blind-hole microcapillaries 114*b*, the grid microcapillaries 114*c*, and/or the plate microcapillary 406 in combination or separately.

The array of the cantilever portions 112 may be configured with different resonant frequencies. For example, the array of the cantilever portions 112 may be configured with different resonant frequencies by defining the microcapillaries 114 with different sizes, lengths, apertures, lattice spacings, and/or lattice densities. By way of another example, the array of the cantilever portions 112 may be configured with different resonant frequencies by the plate microcapillary 406 with different sizes, lengths, and/or apertures. By way of another example, the array of the cantilever portions 112 may be configured with different resonant frequencies by the cantilever portions 112 including different width and/or length. The MEMS densimeter 100 may thus be configured for a range of resonant frequency and may measure the density of fluids with a wide range of viscosities.

Figure 5A:
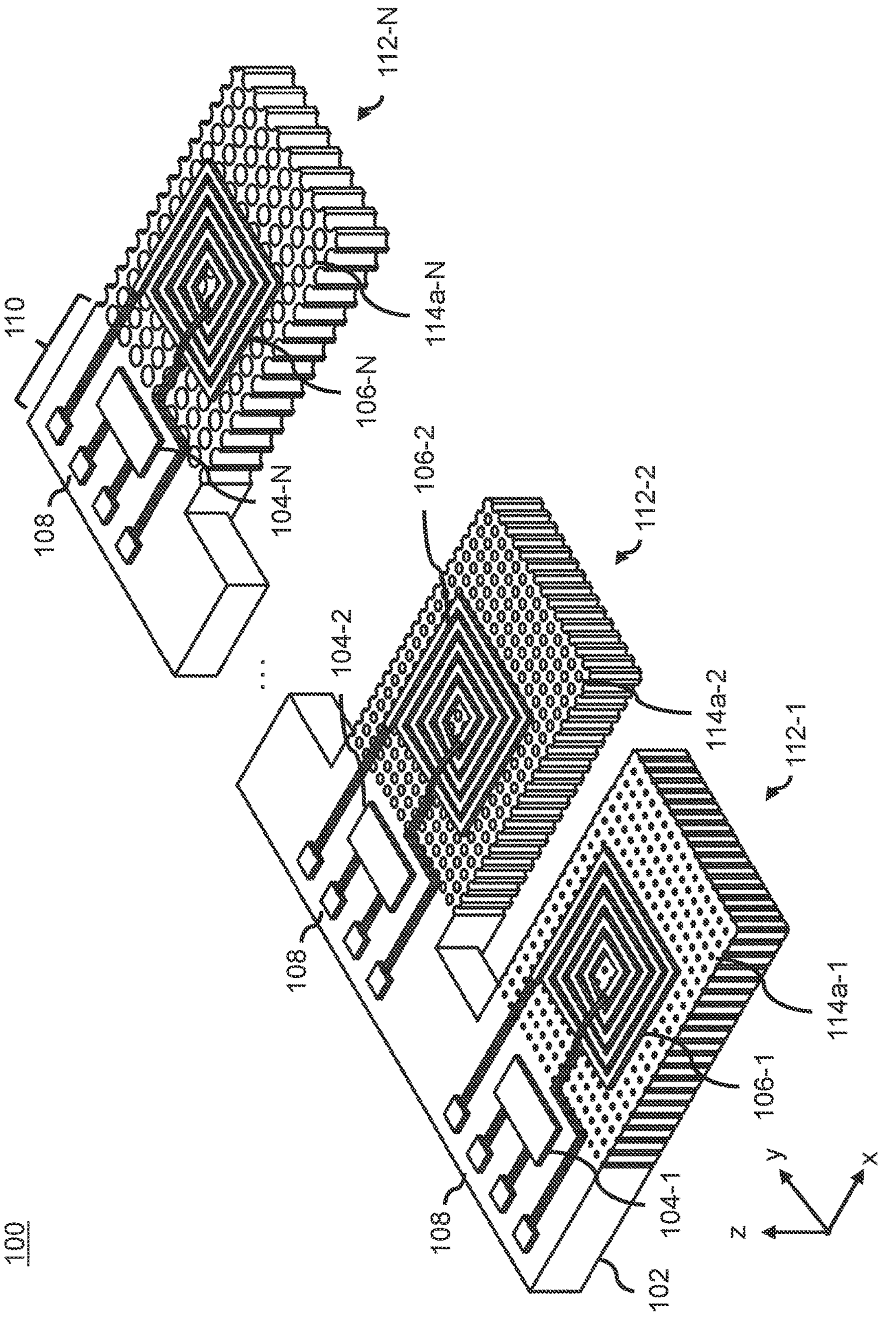
FIGS. 5A-5B depict a perspective and top view, respectively, of the MEMS densimeter with an array of cantilever portions which are configured with different resonant frequencies by defining microcapillaries with different sizes, in accordance with one or more embodiments of the present disclosure.
Figure 5B:
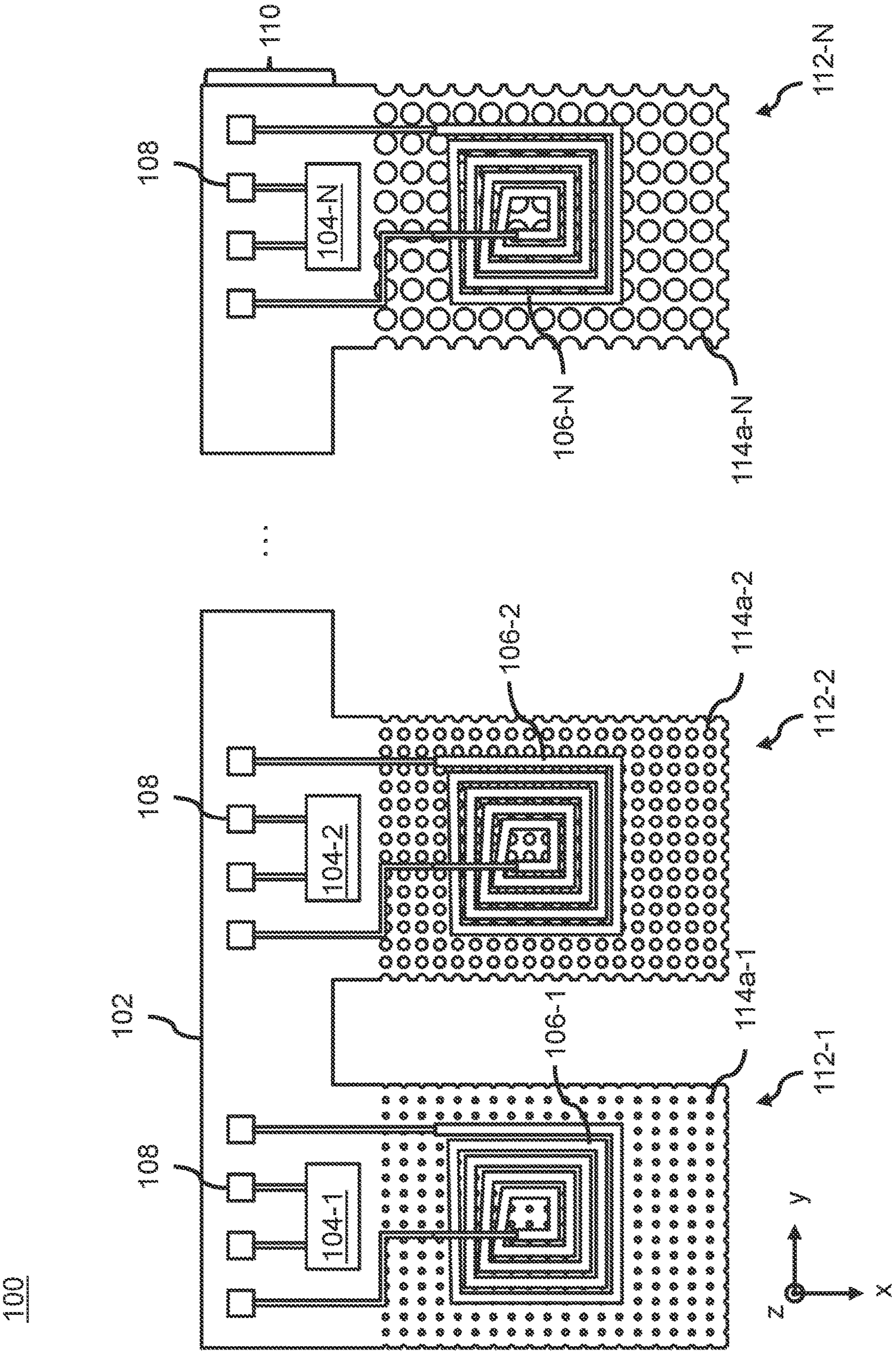

FIGS. 5A-5B depict the MEMS densimeter 100 with the array of cantilever portions 112 which define microcapillaries 114 with different sizes. Each of the array of the cantilever portions 112 may define the microcapillaries 114 (e.g., the through-hole microcapillaries 114*a*, the blind-hole microcapillaries 114*b*, the grid microcapillaries 114*c*). The array of the cantilever portions 112 may define the microcapillaries 114 with the different sizes to tune the resonant frequency of the array of the cantilever portions 112.

The array of the cantilever portions 112 may define the microcapillaries 114, where each of the array of the cantilever portions 112 define the microcapillaries 114 with sizes which increase along the width of the fixed portion 110. The cantilever portion 112-1 may define a smallest size of the microcapillaries 114 and the cantilever portion 112-N may define a largest size of the microcapillaries 114. The cantilever portion 112-1 defining the smallest size of the microcapillaries 114 may be tuned for measuring the density of less viscous fluids and the cantilever portion 112-N defining the largest size of the microcapillaries 114 may be tuned for measuring the density of more viscous fluids. For example, the cantilever portion 112-1 through cantilever portion 112-N may define the through-hole microcapillaries 114*a*-1 through the through-hole microcapillaries 114*a*-N, respectively. The through-hole microcapillaries 114*a*-1 are the smallest size and the through-hole microcapillaries 114*a*-N are the largest size.

Figure 6A:
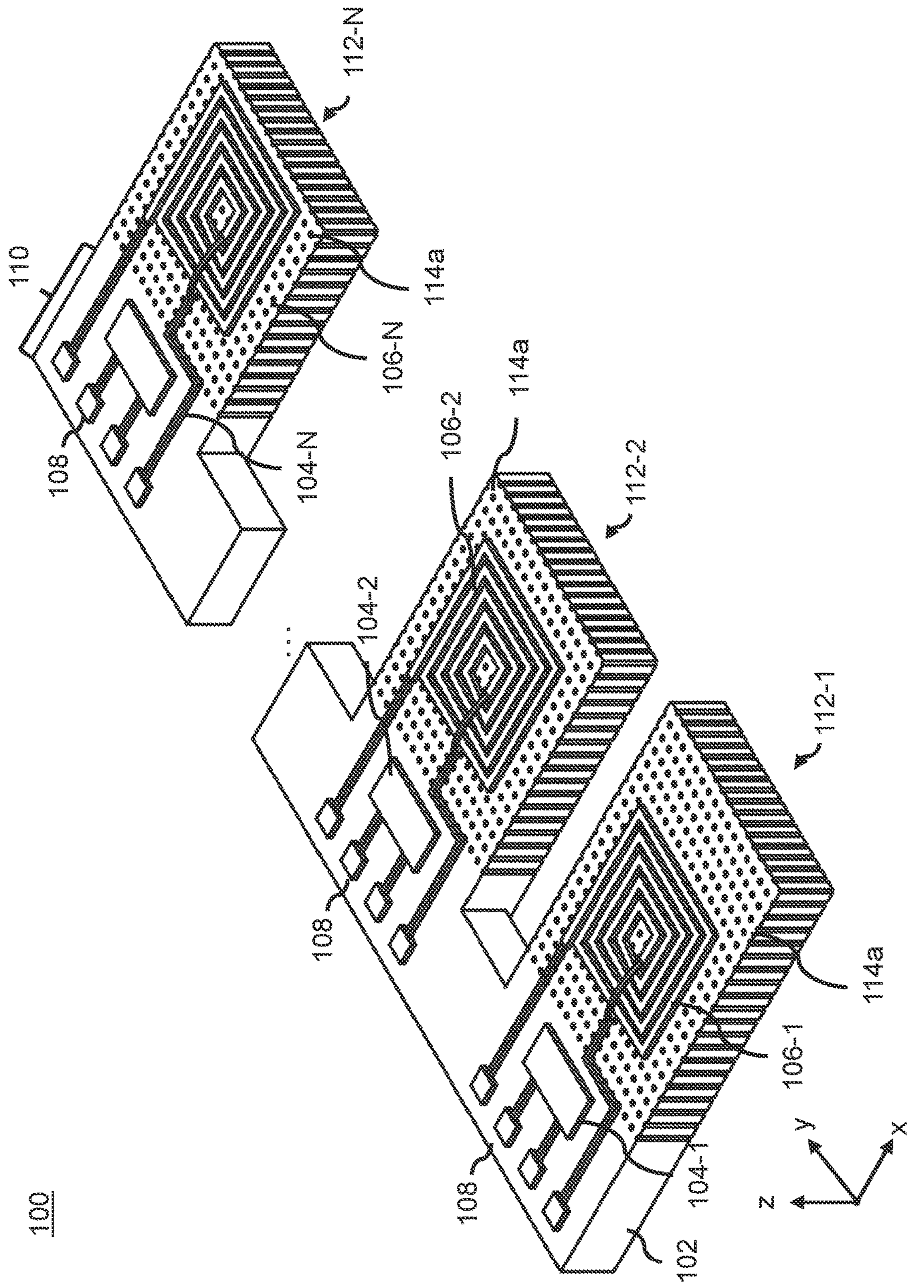
FIGS. 6A-6B depict a perspective and top view, respectively, of the MEMS densimeter with the array of cantilever portions which are configured with different resonant frequency by including different lengths, in accordance with one or more embodiments of the present disclosure.
Figure 6B:
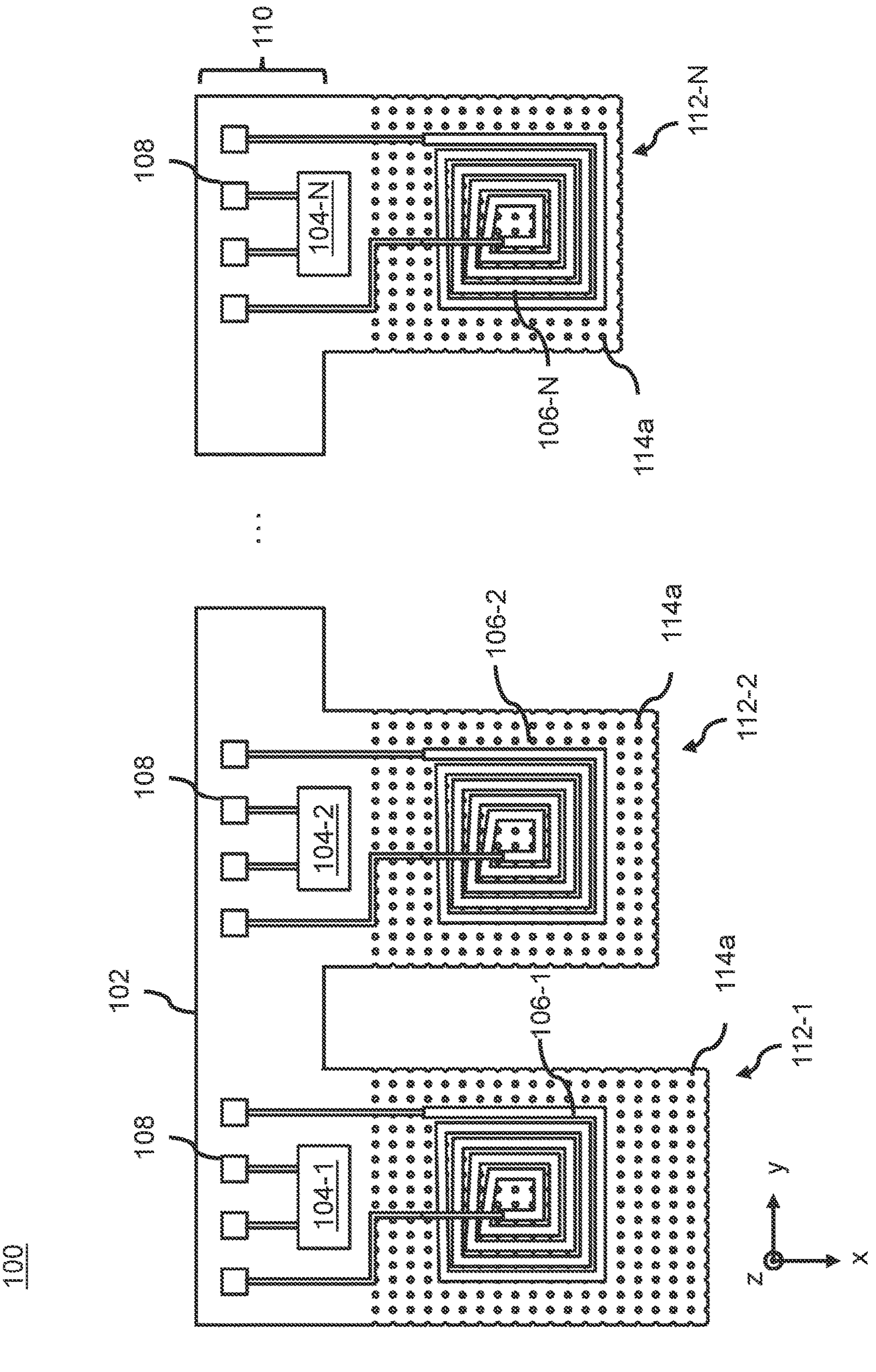

FIGS. 6A-6B depict the MEMS densimeter 100 with the array of cantilever portions 112 with different lengths. The array of the cantilever portions 112 with different lengths may tune the resonant frequency of the array of the cantilever portions 112. The resonant frequency of the cantilever portions 112 may be inversely proportional to the length.

The lengths of the array of the cantilever portions 112 may decrease along the length of the array. The cantilever portion 112-1 may include a shortest length and the cantilever portion 112-N include a longest length. The cantilever portion 112-1 with the shortest length may be tuned for measuring a wider ranges of fluid densities with a lower accuracy and the cantilever portion 112-N with the longest length may be tuned for measuring a smaller range of fluid densities with a higher accuracy.

Figure 7:
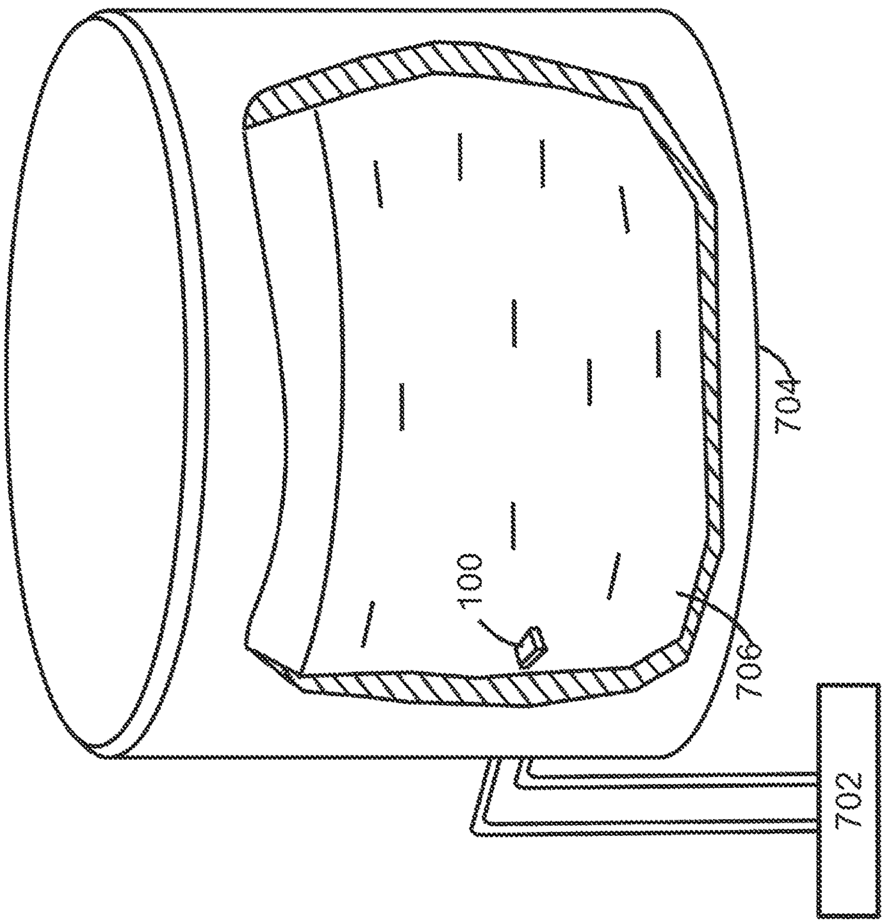
FIG. 7 depicts a partial perspective view of a fuel system with the MEMS densimeter, in accordance with one or more embodiments of the present disclosure.

FIG. 7 depicts a fuel system 700, in accordance with one or more embodiments of the present disclosure. The fuel system 700 may include one or more of the MEMS densimeter 100, a transducer 702, a fluid tank 704, and a fluid 706.

The MEMS densimeter 100 may be fixed within the fluid tank 704. The fixed portion 110 of the substrate 102 of the MEMS densimeter 100 may be fixed to the fluid tank 704.

The fluid tank 704 may hold the fluid 706. The fluid 706 may include, but is not limited to, a fuel. The fuel may include a hydrocarbon fuel, a hydrogen fuel, or the like. For example, the fuel may include a jet fuel (e.g., a lightweight or heavyweight jet fuel). In embodiments, the fuel may include a Sustainable aviation fuel (SAF).

The MEMS densimeter 100 may be submerged within the fluid 706. The cantilever portion 112 of the MEMS densimeter 100 may be submerged within the fluid 706. The fluid 706 may be trapped in the microcapillaries 114 and/or the plate microcapillary 406. The fluid 706 trapped in the microcapillaries 114 and/or the plate microcapillary 406 may change the resonant frequency of the cantilever portions 112.

The transducer 702 may be coupled to the MEMS densimeter 100. For example, the transducer 702 may be coupled to the bond pads 108 of the MEMS densimeter 100. The transducer 702 may be configured to supply the alternating current for the inductors 106. The transducer 702 may be configured to receive the strain measurements from the strain gauges 104.

The transducer 702 may control the alternating current through the inductors 106 to flexure the cantilever portion 112 at the resonant frequency. The transducer 702 may be configured to sweep a frequency of the alternating current supplied to the inductor 106 through a range, and receive the strains measured at the corresponding frequencies. The transducer 702 may find a peak strain from the range of strains. The peak strain may correspond to the resonant frequency of the cantilever portion 112. Thus, the resonant frequency may be determined based on the peak strain.

Referring generally again to figures.

The length and/or width of the cantilever portion 112 may be between 0.1 and 10 mm. The thickness of the cantilever portion 112 may be between 0.001 and 0.1 millimeters.

The resonant frequency at which the cantilever portions 112, the top cantilever portion 402, and/or the bottom cantilever portion 404 may be configured to flexure may be on the order of kHz. For example, the resonant frequency may be between 1 and 999 kHz.

The microcapillaries 114 and/or the plate microcapillary 406 may be configured to fill with the fluid by capillary action. The capillary action may include a surface tension of the liquid and/or a surface adhesion force between the liquid and the microcapillaries 114 and/or the plate microcapillary 406. The size of the microcapillaries 114 and/or the plate microcapillary 406 may be sufficiently small to promote the effect of the surface adhesion force between the liquid and the microcapillaries 114 and/or the plate microcapillary 406. In this regard, the surface adhesion force between the liquid and the microcapillaries 114 and/or the plate microcapillary 406 may be inversely proportional to the size of the microcapillaries 114 and/or the plate microcapillary 406.

The size of the microcapillaries 114 and/or the plate microcapillary 406 must be between sizes which are too small thereby providing insufficient damping and sizes which are too large thereby providing insufficient capillary action. The microcapillaries 114 and/or the plate microcapillary 406 of different dimensions and shapes can be optimized for optimal performance based on the surface tension, viscosity, and/or density of the fluid. The size of the microcapillaries 114 and/or the plate microcapillary 406 may be selected based on the fluid in which the cantilever portion 112 is submerged. The size of the microcapillaries 114 and/or the plate microcapillary 406 may be larger than a boundary layer of the fluid. The size of the microcapillaries 114 and/or the plate microcapillary 406 being larger than the boundary layer of the fluid may enable the fluid to flow into and out of the microcapillaries 114 and/or the plate microcapillary 406 as the cantilever portion 112 flexures, thereby refreshing the microcapillaries 114 and/or the plate microcapillary 406 with the fluid.

The size of the microcapillaries 114 and/or the plate microcapillary 406 may be between 1 and 999 micrometers. The size of the microcapillaries 114 and/or the plate microcapillary 406 may be between 1 and 100 micrometers. For example, the size of the microcapillaries 114 and/or the plate microcapillary 406 may be 1 micrometer, 5 micrometers, 10 micrometers, 50 micrometers, 100 micrometers, or a value therebetween.

The microcapillaries 114 and/or the plate microcapillary 406 may include a range of aspect ratios. For example, the microcapillaries 114 and/or the plate microcapillary 406 may include an aspect ratio between 20-to-1 and 100-to-1. For instance, the microcapillaries 114 and/or the microcapillaries 114 may include an aspect ratio between 50-to-1 and 100-to-1.

The mass of the fluid trapped within the cantilever portion 112 may change the resonant frequency of the cantilever portion 112. The mass of fluid trapped within the cantilever portion 112 may include the mass of fluid trapped within the microcapillaries 114 and/or trapped within the plate microcapillary 406. The resonant frequency of the cantilever portion 112 may be inversely proportional to the mass of the fluid trapped within the cantilever portion 112. The microcapillaries 114 and/or the plate microcapillary 406 may increase a sensitivity of the cantilever portion 112 to the density of the fluid. Thus, the microcapillaries 114 and/or the plate microcapillary 406 may control a damping of the cantilever portion 112.

The MEMS densimeter 100 may be less dependent on the fluid viscosity when measuring the density of the fluid because the mass of the fluid may directly add to the fluid within the microcapillaries 114 and/or the plate microcapillary 406 may directly contribute to the mass of the cantilever portion 112. A quality factor Q of the MEMS densimeter 100 may thus include a smaller contribution from the fluid viscosity.

The microcapillaries 114 and/or the plate microcapillary 406 may temporarily trap the fluid. The microcapillaries 114 and/or the plate microcapillary 406 may include an entrapment time. The entrapment time may be a time in which the fluid is trapped within the microcapillaries 114 and/or the plate microcapillary 406 before leaving the microcapillaries 114 and/or the plate microcapillary 406. The entrapment time may be short enough to account for real time changes of the density of the fluid when measuring the strain. The entrapment time may be on the order of seconds. For example, the entrapment time may be between one and ten seconds.

The cantilever portion 112 may include a thin-film layer (not depicted). The thin-film layer may be disposed within the microcapillaries 114 and/or the plate microcapillary 406. The thin-film layer may define a surface property of the microcapillaries 114 and/or the plate microcapillary 406. The thin-film layer may be hydrophilic. In this regard, the microcapillaries 114 and/or the plate microcapillary 406 may be hydrophilic. The thin-film layer may be deposited within the microcapillaries 114 and/or the plate microcapillary 406 after etching the microcapillaries 114 and/or the plate microcapillary 406. The thin-film layer may be deposited within the microcapillaries 114 and/or the plate microcapillary 406 using a chemical vapor deposition process. For example, the thin-film layer may be deposited within the microcapillaries 114 and/or the plate microcapillary 406 using plasma-enhanced chemical vapor deposition (PECVD), Low pressure chemical vapor deposition (LPCVD), or the like.

It is contemplated that multiple of the MEMS densimeters 100 may be coupled together to form a planar array (not depicted) of the MEMS densimeters 100.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting.

Those having skill in the art will appreciate that there are various vehicles by which processes and/or systems and/or other technologies described herein can be affected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be affected, none of which is inherently superior to the other in that any vehicle to be utilized is a choice dependent upon the context in which the vehicle will be deployed and the specific concerns (e.g., speed, flexibility, or predictability) of the implementer, any of which may vary.

The previous description is presented to enable one of ordinary skill in the art to make and use the invention as provided in the context of a particular application and its requirements. As used herein, directional terms such as "top," "bottom," "over," "under," "upper," "upward," "lower," "down," and "downward" are intended to provide relative positions for purposes of description, and are not intended to designate an absolute frame of reference. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

All of the methods described herein may include storing results of one or more steps of the method embodiments in memory. The results may include any of the results described herein and may be stored in any manner known in the art. The memory may include any memory described herein or any other suitable storage medium known in the art. After the results have been stored, the results can be accessed in the memory and used by any of the method or system embodiments described herein, formatted for display to a user, used by another software module, method, or system, and the like. Furthermore, the results may be stored "permanently," "semi-permanently," temporarily," or for some period. For example, the memory may be random access memory (RAM), and the results may not necessarily persist indefinitely in the memory.

It is noted herein that the one or more components of system may be communicatively coupled to the various other components of system in any manner known in the art. For example, the one or more processors may be communicatively coupled to each other and other components via a wireline connection or wireless connection.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected," or "coupled," to each other to achieve the desired functionality, and any two components capable of being so associated can also be viewed as being "couplable," to each other to achieve the desired functionality. Specific examples of couplable include but are not limited to physically mateable and/or physically interacting components and/or wirelessly interactable and/or wirelessly interacting components and/or logically interacting and/or logically interactable components.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," and the like). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, and the like" is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, and the like). In those instances where a convention analogous to "at least one of A, B, or C, and the like" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, and the like). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed:

1. A Micro-Electro-Mechanical systems (MEMS) densimeter comprising:

a substrate comprising a fixed portion and a cantilever portion, wherein the cantilever portion extends from the fixed portion, wherein the cantilever portion is unsupported at a free end opposite to the fixed portion;

an inductor disposed on the cantilever portion, wherein the inductor is configured to cause the cantilever portion to flexure relative to the fixed portion;

a strain gauge disposed at an interface between the fixed portion and the cantilever portion; and a plurality of bond pads disposed on the fixed portion, wherein the plurality of bond pads are configured to input an alternating current to the inductor, wherein the plurality of bond pads are configured to receive a strain measurement from the strain gauge;

wherein the cantilever portion defines a plurality of microcapillaries through at least a portion of a thickness of the cantilever portion, wherein the plurality of microcapillaries are aligned with the flexure, wherein the plurality of microcapillaries are open through at least the portion of the thickness of the cantilever portion and configured to fill with a liquid by a capillary action.

2. The MEMS densimeter of claim 1, wherein the plurality of microcapillaries filling with the liquid by the capillary action traps the liquid and adds a mass of the liquid to the cantilever portion, wherein the cantilever portion comprises a rectangular shape.

3. The MEMS densimeter of claim 1, comprising at least one of:

a pair of inductors, wherein the inductor is one of the pair of inductors, wherein a top inductor of the pair of inductors is disposed on a top surface of the cantilever portion and a bottom inductor of the pair of inductors is disposed on a bottom surface of the cantilever portion; or a pair of strain gauges, wherein the strain gauge is one of the pair of strain gauges, wherein a top strain gauge of the pair of strain gauges is disposed on a top surface of the substrate at the interface and a bottom strain gauge of the pair of strain gauges is disposed on a bottom surface of the substrate at the interface.

4. The MEMS densimeter of claim 1, wherein the cantilever portion defines the plurality of microcapillaries at the free end.

5. The MEMS densimeter of claim 1, wherein the cantilever portion defines the plurality of microcapillaries between the free end and the fixed portion.

6. The MEMS densimeter of claim 1, wherein the cantilever portion defines the plurality of microcapillaries along one or more edges of the cantilever portion.

7. The MEMS densimeter of claim 1, wherein the plurality of microcapillaries are arranged in a lattice.

8. The MEMS densimeter of claim 7, wherein the lattice comprises one of a rectangular lattice or a square lattice.

9. The MEMS densimeter of claim 1, wherein the plurality of microcapillaries comprise a plurality of through-hole microcapillaries, wherein the plurality of through-hole microcapillaries are defined through the thickness of the cantilever portion, wherein the plurality of through-hole microcapillaries are open through the thickness of the cantilever portion.

10. The MEMS densimeter of claim 1, wherein the plurality of microcapillaries comprise a plurality of blind-hole microcapillaries, wherein the plurality of blind-hole microcapillaries are defined through the portion of the thickness of the cantilever portion, wherein the plurality of blind-hole microcapillaries are open through the portion of the thickness of the cantilever portion.

11. The MEMS densimeter of claim 1, wherein the plurality of microcapillaries comprise a plurality of grid microcapillaries, wherein the plurality of grid microcapillaries are defined through the portion of the thickness of the cantilever portion, wherein the plurality of grid microcapillaries are open through the portion of the thickness of the cantilever portion.

12. The MEMS densimeter of claim 11, wherein the cantilever portion comprises a plurality of pillars and a base, wherein the base extends from the fixed portion, wherein the plurality of pillars extend from the base, wherein the plurality of pillars define the plurality of grid microcapillaries.

13. The MEMS densimeter of claim 1, comprising an array of cantilever portions, an array of inductors, and an array of strain gauges, wherein the cantilever portion is one of the array of cantilever portions, wherein the inductor is one of the array of inductors, wherein the strain gauge is one of the array of strain gauges, wherein the array of cantilever portions are configured to flexure independently.

14. The MEMS densimeter of claim 13, wherein the array of cantilever portions each define the plurality of microcapillaries.

15. The MEMS densimeter of claim 14, wherein the array of cantilever portions are configured with different resonant frequencies.

16. A fuel system comprising:

a Micro-Electro-Mechanical systems (MEMS) densimeter comprising:

a substrate comprising a fixed portion and a cantilever portion, wherein the cantilever portion extends from the fixed portion, wherein the cantilever portion is unsupported at a free end opposite to the fixed portion;

an inductor disposed on the cantilever portion, wherein the inductor is configured to cause the cantilever portion to flexure relative to the fixed portion;

a strain gauge disposed at an interface between the fixed portion and the cantilever portion; and a plurality of bond pads disposed on the fixed portion, wherein the plurality of bond pads are configured to input an alternating current to the inductor, wherein the plurality of bond pads are configured to receive a strain measurement from the strain gauge;

wherein the cantilever portion defines a plurality of microcapillaries through at least a portion of a thickness of the cantilever portion, wherein the plurality of microcapillaries are aligned with the flexure, wherein the plurality of microcapillaries are open through at least the portion of the thickness of the cantilever portion;

a fluid tank, wherein the fixed portion is fixed to the fluid tank; and a fluid, wherein the fluid tank holds the fluid, wherein the cantilever portion is submerged within the fluid, wherein the fluid is a liquid, wherein the plurality of microcapillaries are filled with the liquid by a capillary action.

17. A Micro-Electro-Mechanical systems (MEMS) densimeter comprising:

a substrate comprising a fixed portion and a cantilever portion, wherein the cantilever portion extends from the fixed portion, wherein the cantilever portion is unsupported at a free end opposite to the fixed portion, wherein the cantilever portion comprises a top cantilever portion and a bottom cantilever portion which each extend from the fixed portion;

a pair of inductors, wherein a top inductor of the pair of inductors is disposed on the top cantilever portion, wherein a bottom inductor of the pair of inductors is disposed on the bottom cantilever portion, wherein the top inductor is configured to cause the top cantilever portion to flexure relative to the fixed portion, wherein the bottom inductor is configured to cause the bottom cantilever portion to flexure relative to the fixed portion;

a pair of strain gauges, wherein a top strain gauge of the pair of strain gauges is disposed on a top surface of the substrate at an interface between the fixed portion and the top cantilever portion, wherein a bottom strain gauge of the pair of strain gauges is disposed on a bottom surface of the substrate at an interface between the fixed portion and the bottom cantilever portion; and a plurality of bond pads disposed on the fixed portion, wherein the plurality of bond pads are configured to input an alternating current to the pair of inductors, wherein the plurality of bond pads are configured to receive strain measurements from the pair of strain gauges;

wherein the cantilever portion defines a plate microcapillary between the top cantilever portion and the bottom cantilever portion, wherein the plate microcapillary is open along the free end and configured to fill with a liquid by a capillary action.

18. The MEMS densimeter of claim 17, wherein the plate microcapillary is defined from the free end up to the fixed portion.

19. The MEMS densimeter of claim 17, wherein the plate microcapillary is defined through a width of the cantilever portion.

20. The MEMS densimeter of claim 17, wherein the MEMS densimeter is configured to control a phase of alternating current through the top inductor and a phase of alternating current through the bottom inductor such that the top cantilever portion and the bottom cantilever portion flexure synchronously.

* * * * *